United States Patent
Liu

(10) Patent No.: US 11,550,018 B2
(45) Date of Patent: Jan. 10, 2023

(54) POSITIONING SYSTEM AND POSITIONING METHOD

(71) Applicant: SUZHOU TOUCHAIR TECHNOLOGY CO., LTD., Jiangsu (CN)

(72) Inventor: Guangsong Liu, Jiangsu (CN)

(73) Assignee: SUZHOU TOUCHAIR TECHNOLOGY CO., LTD., Suzhou (CN)

(*) Notice: Subject to any disclaimer, the term of this patent is extended or adjusted under 35 U.S.C. 154(b) by 793 days.

(21) Appl. No.: 16/378,543

(22) Filed: Apr. 8, 2019

(65) Prior Publication Data

US 2019/0235044 A1  Aug. 1, 2019

Related U.S. Application Data

(63) Continuation of application No. PCT/CN2017/095597, filed on Aug. 2, 2017.

(30) Foreign Application Priority Data

Oct. 14, 2016  (CN) .......................... 201610898261.9
Jun. 9, 2017   (CN) .......................... 201710430528.6

(51) Int. Cl.
   *G01S 3/801* (2006.01)
   *G01S 5/00* (2006.01)
   *G01S 5/30* (2006.01)

(52) U.S. Cl.
   CPC ............ *G01S 3/801* (2013.01); *G01S 5/00* (2013.01); *G01S 5/30* (2013.01)

(58) Field of Classification Search
   CPC ...................................................... G01S 3/801
   (Continued)

(56) References Cited

U.S. PATENT DOCUMENTS 3,962,671 A * 6/1976 Jilling .................... F41G 7/001
                                                        73/167
6,700,533 B1 * 3/2004 Werb .................... G01S 5/0018
                                                        701/470
(Continued)

FOREIGN PATENT DOCUMENTS

| CN | 102636774 A | 8/2012 |
| CN | 104459624 A | 3/2015 |
| CN | 105784188 A * | 7/2016 |

OTHER PUBLICATIONS

International Search Report of PCT Patent Application No. PCT/CN2017/095597 dated Sep. 28, 2017.

*Primary Examiner* — Peter J Macchiarolo
*Assistant Examiner* — Mohammed E Keramet-Amircolai

(57) ABSTRACT

Embodiments of the present disclosure provide a positioning system and positioning method. A reverse calibrator for respectively calibrating relative coordinates of at least three ultrasound generators; a processor for generating a carrier signal, multiplying the carrier signal with a spread spectrum pseudo random code to obtain ranging signal, controlling each ultrasound generator to emit ranging signal, and extracting acoustic characteristic parameter of the ranging signals; a device being positioned for capturing ranging signals emitted by each generator, extracting acoustic characteristic parameter of each of the captured ranging signals; determining an ultrasonic delay time of each ultrasonic ranging signal; calculating relative coordinates of the device.

14 Claims, 11 Drawing Sheets

(58) Field of Classification Search
USPC .......................................................... 73/1.82
See application file for complete search history.

(56) References Cited

U.S. PATENT DOCUMENTS

| 2012/0224456 | A1* | 9/2012 | Visser | G01S 7/521 |
| | | | | 367/118 |
| 2018/0149503 | A1* | 5/2018 | Zipperer | G01F 1/662 |
| 2019/0170564 | A1* | 6/2019 | Wahlin | G01F 23/2962 |

* cited by examiner

POSITIONING SYSTEM AND POSITIONING METHOD

CROSS-REFERENCE TO RELATED APPLICATIONS

This application is a Continuation Application of PCT Application No. PCT/CN2017/095597 filed on Aug. 2, 2017, which claims the priority of Chinese Patent Application Nos. 201610898261.9 filed on Oct. 14, 2016 and 201710430528.6 filed on Jun. 9, 2017. The entire contents of all the above are hereby incorporated by reference.

FIELD

The present invention relates to the field of computer technologies, and in particular, to a positioning system and positioning method.

BACKGROUND

With continuous development of modern society, indoor space is becoming complex and users are paying more attention to indoor positioning services. For example, users hope to freely navigate through mobile devices in indoor environments such as exhibition halls, shopping malls, warehouses, workshops, etc., and solve the problem of "last mile".

At present, positioning technologies mainly include PPD positioning method, GPS satellite positioning method, Bluetooth positioning method, WIFI network positioning method, Beidou positioning method and GPRS/CDMA mobile communication positioning method. At present, outdoor GPS positioning accuracy can reach ten meters and indoor positioning accuracy can reach centimeter level. There are many factors affecting the positioning accuracy, such as the accuracy of ranging, delay time detection or energy attenuation detection and the positional accuracy of reference point of a signal transmitting end. The factors such as distance measurement, delay time and signal energy detection have been deeply studied. At present, it is a common way to manually measure the position of reference point, which inevitably leads to large deviations and brings a large error to the accuracy of positioning applications.

Moreover, frequency deviation caused by the Doppler phenomenon makes the positioning error larger in a scene of positioning a moving object.

SUMMARY

In view of above, Embodiments of the present invention provide a positioning system and positioning method.

The technical solution of the embodiment of the present invention is as follows:

In one aspect, provided is a positioning system, comprising a reverse calibrator, an ultrasound generating unit and a device being positioned; the ultrasound generating unit comprising at least three ultrasound generators and a processor, wherein the reverse calibrator, configured to respectively calibrate relative coordinates of the at least three ultrasound generators in a field coordinate system;

the processor, configured to generate a carrier signal, multiply the carrier signal with a spread-spectrum pseudo-random code to obtain an ultrasonic ranging signal, control each of the at least three ultrasound generators to respectively emit the ultrasonic ranging signal, and respectively extract acoustic characteristic parameter of the each ultrasonic ranging signal emitted by each ultrasound generator;

the device being positioned, configured to respectively capture each ultrasonic ranging signal emitted by each ultrasound generator, respectively extract acoustic characteristic parameter of each of the captured ultrasonic ranging signals, respectively determine an ultrasonic delay time of ultrasonic ranging signal based on the acoustic characteristic parameter of the ultrasonic ranging signal emitted by each ultrasound generator and the acoustic characteristic parameter of the captured corresponding ultrasonic ranging signal, calculate relative coordinates of the device being positioned in the field coordinate system based on at least three ultrasonic delay times and calibrated relative coordinates of the at least three ultrasound generators in the field coordinate system.

Preferably, wherein the reverse calibrator comprising:

a level module, configured to maintain the reverse calibrator level during the calibration process;

a distance measuring module, configured to measure a distance between a reverse calibrator placement point and a measured point, wherein the measured point includes a calibration point and a reference point, wherein the reference point includes a coordinate origin of the site coordinate system and a predetermined point on an axis of the site coordinate system, the calibration point includes arrangement point of each ultrasound generator;

an angle measuring module, configured to measure azimuth angle and pitch angle of the measured point relative to the reverse calibrator placement point;

a signal processor, configured to calculate relative coordinates of the predetermined point in the site coordinate system based on a distance between the coordinate origin and the reverse calibrator placement point, an azimuth angle of the coordinate origin relative to the reverse calibrator placement point, a pitch angle of the coordinate origin relative to the reverse calibrator placement point, a distance between the predetermined point and the reverse calibrator placement point, an azimuth angle of the predetermined point relative to the reverse calibrator placement point and a pitch angle of the predetermined point relative to the reverse calibrator placement point, calculate relative coordinates of the calibration point in the site coordinate system based on relative coordinates of the predetermined point in the site coordinate system, the distance between the coordinate origin and the reverse calibrator placement point, the azimuth angle of the coordinate origin relative to the reverse calibrator placement point, the pitch angle of the coordinate origin relative to the reverse calibrator placement point, the distance between the predetermined point and the reverse calibrator placement point, the azimuth angle of the predetermined point relative to the reverse calibrator placement point, the pitch angle of the predetermined point relative to the reverse calibrator placement point, the distance between the calibration point and the reverse calibrator placement point, the azimuth angle of the calibration point relative to the reverse calibrator placement point and the pitch angle of the calibration point relative to the reverse calibrator placement point.

Preferably, wherein the signal processor is further configured to acquire latitude and longitude coordinates of the coordinate origin and latitude and longitude coordinates of the predetermined point; calculate an angle between the northward axis of the field coordinate system and a geographical north based on the latitude and longitude coordinates of the coordinate origin and the latitude and longitude coordinates of the predetermined point; calculate latitude and longitude coordinates of the calibration point based on the angle and relative coordinates of the calibration point in the site coordinate system, and/or relative coordinates of the predetermined point in the site coordinate system are $(X_B, 0, 0)$, wherein $$X_B = \sqrt{(\cos\alpha_O r_O)^2 + (\cos\alpha_B r_B)^2 - 2\cos(\theta_O - \theta_B)\cdot\cos\alpha_O r_O \cdot \cos\alpha_B r_B};$$

wherein relative coordinates of the coordinate origin in the site coordinate system are (0, 0, 0); the distance between the coordinate origin and the reverse calibrator placement point is $r_0$; the azimuth angle of the coordinate origin relative to the reverse calibrator placement point is $\theta_0$; the pitch angle of the coordinate origin relative to the reverse calibrator placement point is $\alpha_0$; the distance between the predetermined point and the reverse calibrator placement point is $r_B$; the azimuth angle of the predetermined point relative to the reverse calibrator placement point is $\theta_B$; the pitch angle of the predetermined point relative to the reverse calibrator placement point is $\alpha_B$; the site coordinate system comprising Y axis, X axis and Z axis and the coordinate origin, wherein the Y axis is northward in the field, and latitude and longitude coordinates of the calibration point are (W, J);

wherein $$W = W1 + \frac{Y'}{R0} * \frac{180}{\pi};$$

$$J = J1 + \frac{X'}{\cos(W1)R0} * \frac{180}{\pi};$$

$$\begin{cases} X' = \cos\gamma * X - \sin\gamma * Y \\ Y' = \sin\gamma * X + \cos\gamma * Y \end{cases};$$

R0 is an average radius of the earth; (W1, J1) is latitude and longitude coordinate of the coordinate origin; $\gamma$ is the angle between the northward axis of the site coordinate system and geographical north; (X, Y) is the relative coordinates of the calibration point in the site coordinate system coordinate.

Preferably, wherein the spread-spectrum pseudo-random code is an m-sequence or a pseudo-random sequence derived from m-sequence; or the spread-spectrum pseudo-random code is obtained based on the following steps:

configuring m sequence of length $(2^n-1)$, where n is a positive integer;

extending the m sequence of length $(2^n-1)$ to m sequence of length $2^n$;

generating M sequence based on m sequence of length $2^n$, M=FFT(1-2 m), where FFT is fast Fourier transform function;

generating a M' sequence of length $2^n$ based on the M sequence according to a formula $$M'[k] = \begin{cases} M[k] & 1 \leq k \leq 2^{n-1}-1 \\ \text{abs}M[1] & k = 2^{n-1} \\ M[k-1] & 2^{n-1}+1 \leq k \leq 2^n \end{cases},$$

wherein k is a point number, abs is an absolute value function;

performing an inverse fast Fourier transform on the M' sequence of length $2^n$ to generate an m' sequence as the pseudorandom code.

wherein the ultrasound generating unit and the device being positioned are configured in a same device to collectively constitute a single-ended system; or wherein the ultrasound generating unit and the device being positioned are configured in different devices to collectively constitute a double-ended system.

Preferably, wherein determining the ultrasonic delay time comprises:

converting the length of the ultrasonic ranging signal captured by the device being positioned to the same length as the ultrasonic ranging signal emitted by the ultrasound generator, by up sampling or down sampling;

performing a cross-correlation operation based on the ultrasonic ranging signal emitted by the ultrasound generator and the length-converted ultrasonic ranging signal to obtain a cross-correlation sequence;

finding a position corresponding to a maximum correlation value in the cross-correlation sequence;

calculating the ultrasonic delay time based on the position corresponding to the maximum correlation value in the cross-correlation sequence, the acoustic characteristic parameter of the ultrasonic ranging signal emitted by the ultrasound generator, and the acoustic characteristic parameter of the captured ultrasonic ranging signal.

Preferably, wherein the signal processor, further configured to acquire latitude and longitude coordinates of the coordinate origin and latitude and longitude coordinates of the predetermined point; calculate the angle between the northward axis of the field coordinate system and the geographical north based on latitude and longitude coordinates of the coordinate origin and latitude and longitude coordinates of the predetermined point; calculate latitude and longitude coordinates of the calibration point by the angle;

the positioning system further comprising:

a cloud database, configured to receive latitude and longitude coordinates of the calibration point from the signal processor, and correspondingly identify latitude and longitude coordinates of the calibration point to a predetermined map.

Preferably, wherein the device being positioned, further configured to acquire latitude and longitude coordinates of the coordinate origin and latitude and longitude coordinates of the predetermined point; calculate the angle between the northward axis of the site coordinate system and the geographical north based on latitude and longitude coordinates of the coordinate origin and latitude and longitude coordinates of the predetermined point; calculate latitude and longitude coordinates of the device being positioned;

the positioning system further comprising:

a cloud database, configured to receive latitude and longitude coordinates of the device being positioned from the device being positioned, and correspondingly identify latitude and longitude coordinates of the located device to a predetermined map.

In one aspect, provided is a positioning method, characterized in that the method is applicable to a positioning system comprising a reverse calibrator, an ultrasound generating unit and a device being positioned, wherein the ultrasound generating unit comprising at least three ultrasound generators and a processor, the method comprising:

enabling the reverse calibrator to respectively calibrate relative coordinates of the at least three ultrasound generators in a field coordinate system;

enabling the processor to generate a carrier signal, multiply the carrier signal with a spread-spectrum pseudo-random code to obtain an ultrasonic ranging signal, control each of the at least three ultrasound generators to respectively emit the ultrasonic ranging signal, and respectively extract acoustic characteristic parameter of the each ultrasonic ranging signal emitted by each ultrasound generator;

enabling the device being positioned to respectively capture each ultrasonic ranging signal emitted by each ultrasound generator, respectively extract acoustic characteristic parameter of each of the captured ultrasonic ranging signals, respectively determine an ultrasonic delay time of each ultrasonic ranging signal based on the acoustic characteristic parameter of the ultrasonic ranging signal emitted by each ultrasound generator and the acoustic characteristic parameter of the captured corresponding ultrasonic ranging signal, calculate relative coordinates of the device being positioned in the field coordinate system based on at least three ultrasonic delay times and calibrated relative coordinates of the at least three ultrasound generators in the field coordinate system.

Preferably, wherein the enabling the reverse calibrator to respectively calibrate relative coordinates of the at least three ultrasound generators in a field coordinate system comprise:

measuring a distance between a reverse calibrator placement point and a measured point, azimuth angle of the measured point relative to the reverse calibrator placement point and pitch angle of the measured point relative to the reverse calibrator placement point, wherein the measured point includes a calibration point and a reference point, wherein the reference point includes a coordinate origin of the site coordinate system and a predetermined point on an axis of the site coordinate system, the calibration point includes arrangement point of each ultrasound generator;

calculating relative coordinates of the predetermined point in the site coordinate system based on a distance between the coordinate origin and the reverse calibrator placement point, an azimuth angle of the coordinate origin relative to the reverse calibrator placement point, a pitch angle of the coordinate origin relative to the reverse calibrator placement point, a distance between the predetermined point and the reverse calibrator placement point, an azimuth angle of the predetermined point relative to the reverse calibrator placement point and a pitch angle of the predetermined point relative to the reverse calibrator placement point; calculating relative coordinates of the calibration point in the site coordinate system based on relative coordinates of the predetermined point in the site coordinate system, the distance between the coordinate origin and the reverse calibrator placement point, the azimuth angle of the coordinate origin relative to the reverse calibrator placement point, the pitch angle of the coordinate origin relative to the reverse calibrator placement point, the distance between the predetermined point and the reverse calibrator placement point, the azimuth angle of the predetermined point relative to the reverse calibrator placement point, the pitch angle of the predetermined point relative to the reverse calibrator placement point, the distance between the calibration point and the reverse calibrator placement point, the azimuth angle of the calibration point relative to the reverse calibrator placement point and the pitch angle of the calibration point relative to the reverse calibrator placement point.

Preferably, wherein the spread-spectrum pseudo-random code is an m-sequence or a pseudo-random sequence derived from m-sequence; or the spread-spectrum pseudo-random code is obtained based on the following steps: configuring m sequence of length ($2^n$-1), where n is a positive integer;

extending the m sequence of length ($2^n$-1) to m sequence of length $2^n$;

generating M sequence based on m sequence of length $2^n$, M=FFT(1-2 m), where FFT is fast Fourier transform function;

generating a M' sequence of length $2^n$ based on the M sequence according to a formula $$M'[k] = \begin{cases} M[k] & 1 \le k \le 2^{n-1} - 1 \\ \text{abs} M[1] & k = 2^{n-1} \\ M[k-1] & 2^{n-1} + 1 \le k \le 2^n \end{cases},$$

wherein k is a point number, abs is an absolute value function;

performing an inverse fast Fourier transform on the M' sequence of length $2^n$ to generate an m' sequence as the pseudorandom code.

Preferably, wherein determining the ultrasonic delay time comprises:

converting the length of the ultrasonic ranging signal captured by the device being positioned to the same length as the ultrasonic ranging signal emitted by the ultrasound generator, by up sampling or down sampling;

performing a cross-correlation operation based on the ultrasonic ranging signal emitted by the ultrasound generator and the length-converted ultrasonic ranging signal to obtain a cross-correlation sequence;

finding a position corresponding to a maximum correlation value in the cross-correlation sequence;

calculating the ultrasonic delay time based on the position corresponding to the maximum correlation value in the cross-correlation sequence, the acoustic characteristic parameter of the ultrasonic ranging signal emitted by the ultrasound generator, and the acoustic characteristic parameter of the captured ultrasonic ranging signal.

Preferably, further comprising:

acquiring latitude and longitude coordinates of the coordinate origin and latitude and longitude coordinates of the predetermined point; calculating the angle between the northward axis of the field coordinate system and the geographical north based on latitude and longitude coordinates of the coordinate origin and latitude and longitude coordinates of the predetermined point;

calculating latitude and longitude coordinates of the calibration point by the angle; correspondingly identifying latitude and longitude coordinates of the calibration point to a predetermined map; and/or calculating latitude and longitude coordinates of the device being positioned by the angle; correspondingly identifying latitude and longitude coordinates of the device being positioned to a predetermined map.

Preferably, wherein the respectively calibrating relative coordinates of the at least three ultrasound generators in a field coordinate system comprises:

enabling the reverse calibrator to respectively calibrate the relative coordinates of each of the at least three ultrasound generators in the field coordinate system when the at least three ultrasound generators are in random mounting positions in the field coordinate system; or when the mounting positions of the at least three ultrasound generators have a predetermined geometric relationship in the field coordinate system, enabling the reverse calibrator to calibrate the relative coordinates of one of the at least three ultrasound generators in the field coordinate system and calculate the relative coordinates of the remaining ultrasound generators in the field coordinate system based on the predetermined geometric relationship and the relative coordinates of the ultrasound generator in the field coordinate system obtained by the calibration.

DETAILED DESCRIPTION

In order to make the objects, technical solutions and advantages of the present invention more clear, the embodiments of the present invention will be further described in detail below with reference to the accompanying drawings.

Due to characteristics of strong directivity, slow energy consumption and long distances of propagation in medium, ultrasonic waves are often used for distance measurement, such as range finder and level measuring instrument, which can be realized by ultrasonic waves. Ultrasonic inspection is often quick, convenient, easy to calculate and control in real time and meets industrial and practical requirements in terms of measurement accuracy.

In the embodiment of the present invention, an ultrasonic-based positioning technique is proposed, which is especially suitable for indoor positioning. The embodiment of the present invention possess at least one of the following features: (1) applying ultrasonic ranging to improve indoor positioning accuracy; (2) reverse calibrating reference position of a ultrasonic transmitting end such that the error of reference coordinates is within an allowable range; (3) proposing a spread spectrum technology to reduce error caused by the Doppler phenomenon when a moving object is positioned; (4) proposing a coordinate conversion technology to combine an indoor coordinates into latitude and longitude map.

Figure 1:
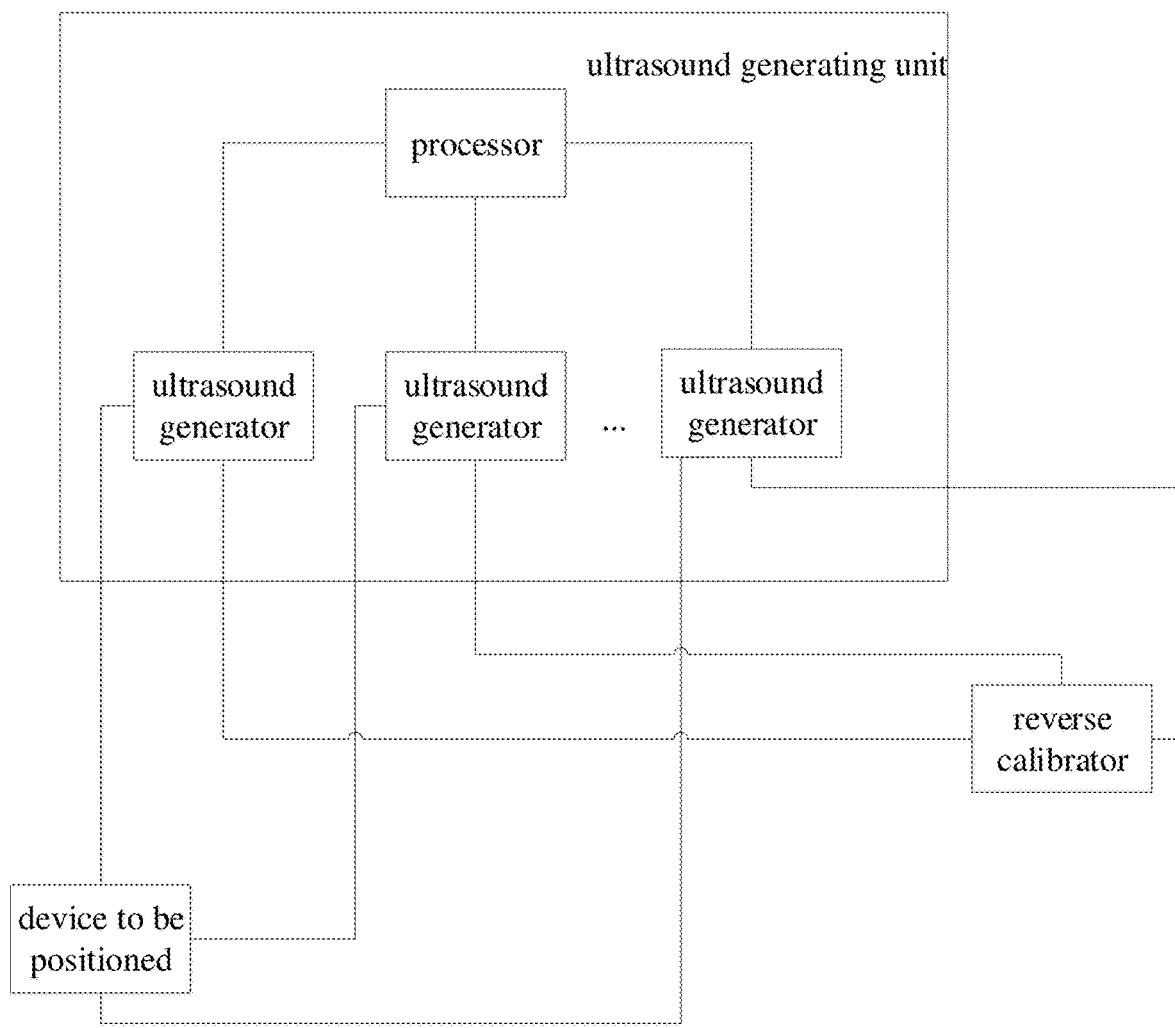
FIG. 1 is an exemplary structural diagram of a positioning system according to an embodiment of the present invention.

FIG. 1 is an exemplary structural diagram of a positioning system according to an embodiment of the present invention. As shown in FIG. 1, the positioning system comprises a reverse calibrator, an ultrasound generating unit and a device being positioned. The ultrasound generating unit comprises at least three ultrasound generators and a processor. The reverse calibrator is configured to respectively calibrate relative coordinates of the at least three ultrasound generators in a field coordinate system. The processor is configured to generate a carrier signal, multiply the carrier signal with a spread-spectrum pseudo-random code to obtain an ultrasonic ranging signal, control each of the at least three ultrasound generators to respectively emit the ultrasonic ranging signal, and respectively extract acoustic characteristic parameter of the each ultrasonic ranging signal emitted by each ultrasound generator. The device being positioned is configured to respectively capture each ultrasonic ranging signal emitted by each ultrasound generator, respectively extract acoustic characteristic parameter of each of the captured ultrasonic ranging signals, respectively determine an ultrasonic delay time of each ultrasonic ranging signal based on the acoustic characteristic parameter of the ultrasonic ranging signal emitted by ultrasound generator and the acoustic characteristic parameter of the captured corresponding ultrasonic ranging signal, calculate relative coordinates of the device being positioned in the field coordinate system based on at least three ultrasonic delay times and calibrated relative coordinates of the at least three ultrasound generators in the field coordinate system.

The reverse calibrator is configured to calibrate relative coordinates of the ultrasound generator in the ultrasound generating unit. The reverse calibrator calibrates relative coordinates of ultrasound generator(s) in the ultrasound generating unit according to coordinate origin and predetermined point on an axis of coordinate system. That is, the coordinates of a generator in the site coordinate system X-Y-Z are calculated based on a distance, azimuth and pitch angle measurements of the calibrated generator obtained by the reverse calibrator. In the case where respective generators in the ultrasound generating unit are randomly distributed, it is necessary to calibrate coordinates of each generator in the generating unit. When respective generators in the generating unit are distributed in a fixed geometry, it is only necessary to calibrate coordinates of a main generator in the ultrasound generating unit. The reverse calibrator uses laser ranging during the measurement process. The laser ranging accuracy is up to 1 mm, and the azimuth and pitch angle measured at a same point with an accuracy of 0.1°. The measurement range is within 10 m, and the coordinate error of the calibrated ultrasound generator can be limited to 1 cm.

Preferably, wherein the reverse calibrator comprising: a level module, configured to maintain the reverse calibrator level during the calibration process; a distance measuring module, configured to measure a distance between a reverse calibrator placement point and a measured point, wherein the measured point includes a calibration point and a reference point, wherein the reference point includes a coordinate origin of the site coordinate system and a predetermined point on an axis of the site coordinate system, the calibration point includes arrangement point of each ultrasound generator; an angle measuring module, configured to measure azimuth angle and pitch angle of the measured point relative to the reverse calibrator placement point; a signal processor, configured to calculate relative coordinates of the predetermined point in the site coordinate system based on a distance between the coordinate origin and the reverse calibrator placement point, an azimuth angle of the coordinate origin relative to the reverse calibrator placement point, a pitch angle of the coordinate origin relative to the reverse calibrator placement point, a distance between the predetermined point and the reverse calibrator placement point, an azimuth angle of the predetermined point relative to the reverse calibrator placement point and a pitch angle of the predetermined point relative to the reverse calibrator placement point, calculate relative coordinates of the calibration point in the site coordinate system based on relative coordinates of the predetermined point in the site coordinate system, the distance between the coordinate origin and the reverse calibrator placement point, the azimuth angle of the coordinate origin relative to the reverse calibrator placement point, the pitch angle of the coordinate origin relative to the reverse calibrator placement point, the distance between the predetermined point and the reverse calibrator placement point, the azimuth angle of the predetermined point relative to the reverse calibrator placement point, the pitch angle of the predetermined point relative to the reverse calibrator placement point, the distance between the calibration point and the reverse calibrator placement point, the azimuth angle of the calibration point relative to the reverse calibrator placement point and the pitch angle of the calibration point relative to the reverse calibrator placement point.

Preferably, wherein the ultrasound generating unit and the device being positioned are configured in a same device to collectively constitute a single-ended system; or, wherein the ultrasound generating unit and the device being positioned are configured in different devices to collectively constitute a double-ended system.

In one embodiment, the signal processor is further configured to acquire latitude and longitude coordinates of the coordinate origin and latitude and longitude coordinates of the predetermined point, calculate the angle between the northward axis of the field coordinate system and the geographical north based on latitude and longitude coordinates of the coordinate origin and latitude and longitude coordinates of the predetermined point, calculate latitude and longitude coordinates of the calibration point by the angle. The positioning system further comprising a cloud database, configured to receive latitude and longitude coordinates of the calibration point from the signal processor, and correspondingly identify latitude and longitude coordinates of the calibration point to a predetermined map.

In one embodiment, the device being positioned is further configured to acquire latitude and longitude coordinates of the coordinate origin and latitude and longitude coordinates of the predetermined point, calculate the angle between the northward axis of the site coordinate system and the geographical north based on latitude and longitude coordinates of the coordinate origin and latitude and longitude coordinates of the predetermined point, calculate latitude and longitude coordinates of the device being positioned. The positioning system further comprising a cloud database, configured to receive latitude and longitude coordinates of the device being positioned from the device being positioned, and correspondingly identify latitude and longitude coordinates of the located device to a predetermined map.

Specifically, the device being positioned is a smart terminal that can move freely indoors and the like. Smart terminals include but not limited to feature phones, smart phones, PDAs, personal computers (PCs), tablets or personal digital assistants (PDAs) and the like. Moreover, smart terminal is applicable to any smart terminal operating system. Operating systems include but not limited to: Android, Palm OS, Symbian, Windows mobile, Linux, iPhone OS, Blackberry OS 6.0, Windows Phone series, and the like. In one embodiment of the present invention, the smart terminal may specifically adopt Android operating system and smart terminal may adopt various versions of Android, including but not limited to: Android Beta, clockwork robot (Android 1.0), Cupcakes (Android 1.5), Donuts (Android 1.6), Muffins (Android 2.0/2.1), Frozen Yogurt (Android 2.2), Gingerbread (Android 2.3), Honeycomb (Android 3.0), Ice Cream Sandwich (Android 4.0), Jelly Bean (Android 4.1) and other versions. The specific version of the Android platform is listed in detail above. Those skilled in the art can appreciate that the embodiments of the present invention are not limited to the listed above, but can also be applied to any other version based on Android software architecture.

Figure 2:
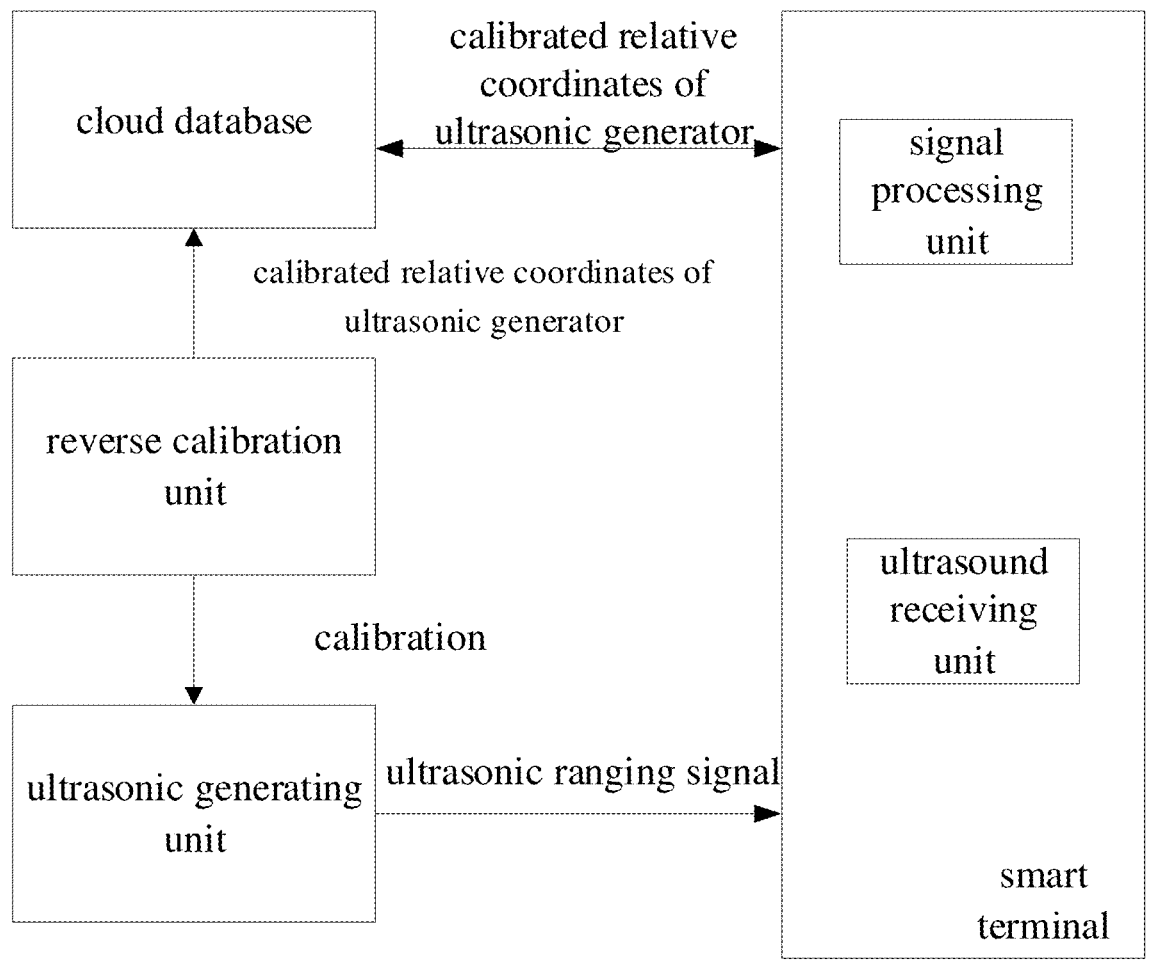
FIG. 2 is an exemplary structural diagram of an ultrasonic positioning system of the present invention.

Based on the above description, FIG. 2 is an exemplary structural diagram of the ultrasonic positioning system of the present invention. As shown in FIG. 2, the ultrasonic positioning system includes an ultrasound generating unit, a reverse calibration unit, a smart terminal (device being positioned), and a cloud database. The smart terminal includes an ultrasound receiving unit and a signal processing unit. The ultrasound generating unit includes at least three ultrasound generators and a processor. Each ultrasound generator is configured to transmit an ultrasonic ranging signal comprising ID information of the ultrasound generator. The processor is configured to control each ultrasound generator in the ultrasound generating unit to simultaneously transmit respective ultrasonic ranging signals at a same frequency. The reverse calibration unit is used to calibrate relative coordinates of each ultrasound generator in the ultrasound generating unit in the indoor coordinate system. The reverse calibration unit includes a level module, a distance measuring module, an angle measuring module and a signal processor. The level module includes a level and a tripod. The height of the tripod is adjusted by the level so that the reverse calibrator remains at an absolute level at the calibration measurement point. The distance measuring module is configured to measure a distance r between calibrator placement point and ultrasonic signal transmitter, which can be measured by laser, ultrasound or the like. Angle measurement module is configured to measure azimuth angle $\theta$ and pitch angle $\partial$ of the calibrator point to ultrasonic signal transmitter. Signal processor is configured to calculate relative coordinates of a measured point in the site coordinate based on azimuth angle $\theta$, pitch angle $\partial$ and distance r, the measured point includes a calibration point and a reference point, wherein the reference point includes a coordinate origin of the site coordinate system and a predetermined point on an axis of the site coordinate system, the calibration point includes arrangement point of each ultrasound generator. The signal processor can also convert relative coordinates into latitude and longitude coordinates. The signal processor integrates a communication module, and the communication module is configured to communicate with a cloud database, and send the calibrated relative coordinates and latitude and longitude coordinates to the cloud database.

An ultrasound receiving unit disposed in the smart terminal, configured to receive respective ultrasonic ranging signals of respective ultrasound generators in the ultrasound generating unit. The numbers of received ultrasonic ranging signals are at least three, and are from the same ultrasound generating unit. The ultrasound receiving unit may be a microphone device integrated in the smart terminal.

A signal processing unit disposed in the smart terminal, configured to calculate an ultrasonic delay time and a distance between an ultrasound generator and the ultrasound receiving unit according to ultrasonic ranging signal received by the ultrasound receiving unit, and calculate relative coordinates of the smart terminal according to post-calibration relative coordinates of the ultrasound generator acquired from cloud database. The smart terminal converts the relative coordinates into latitude and longitude coordinates and sends them to the cloud. Alternatively, the smart terminal directly sends relative coordinates of the smart terminal to the cloud, and the cloud converts the relative coordinates of the smart terminal into latitude and longitude coordinates, and identifies the latitude and longitude coordinates to a latitude and longitude map.

The smart terminal is a device being positioned in which an ultrasonic signal receiving unit and a signal processing unit are integrated, and the smart terminal can communicate with a cloud database. The cloud database is used to store a map, ultrasound emission group ID, relative coordinates and latitude and longitude coordinates of each ultrasound generating unit in the ultrasound emission group, and the like.

Figure 3:
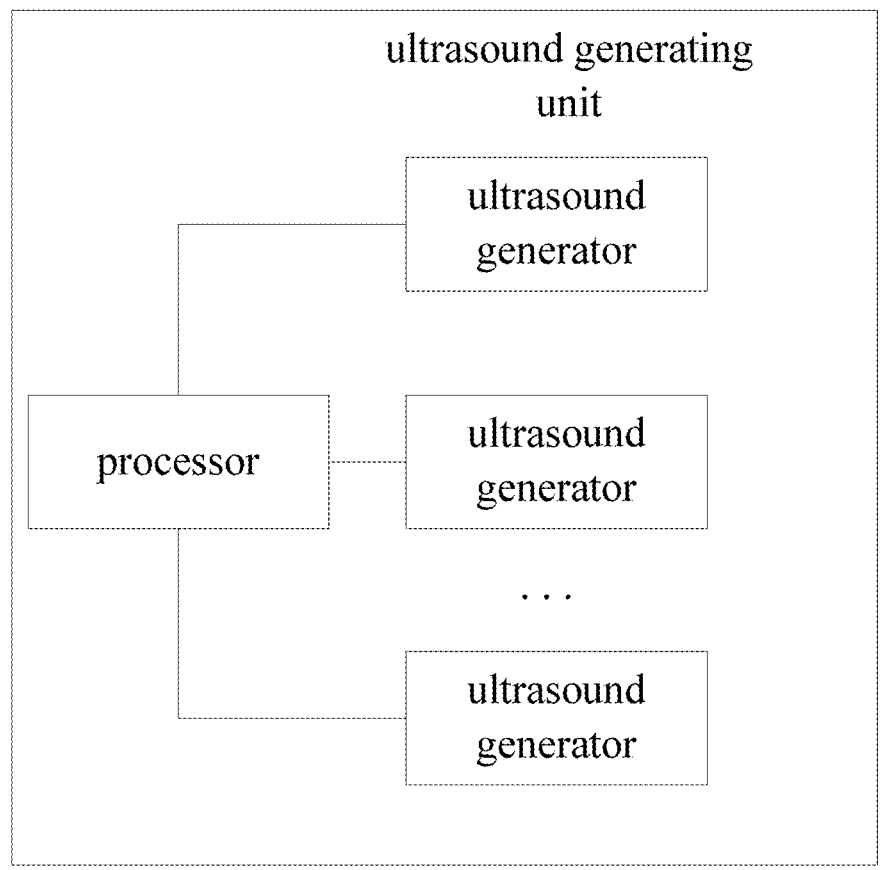
FIG. 3 is an exemplary structural diagram of the ultrasound generating unit of FIG. 2.

FIG. 3 is an exemplary structural diagram of the ultrasound generating unit of FIG. 2. In FIG. 3, the ultrasound generators in the ultrasound generating unit can be randomly distributed at any mounting position, or can be regularly distributed on a fixed geometry (except for a circle), such as a regular triangle. A main generator is placed at the center of the regular triangle. Based on coordinates of the main generator, coordinates of the ultrasound generator distributed at other positions of the regular triangle can be calculated. If all ultrasound generators in the ultrasound generating unit are randomly distributed, the reverse calibrator needs to calibrate relative coordinates of each of the ultrasound generators. If all ultrasound generators in the ultrasound generating unit are regularly distributed on a fixed geometry, the reverse calibrator only needs to calibrate coordinates of a main generator in the ultrasound generating unit. Coordinates of other ultrasound generators can be calculated based on the main generator coordinates and geometric relationships of the fixed geometry.

Each of the ultrasound generating units described above can also control the transmitting of the ultrasonic ranging signal by integrating a controller in each of the ultrasound generators. All ultrasound generators keep clock synchronization by synchronizing signals such as optical signals or electromagnetic signals.

The reverse calibration process of the embodiment of the present invention will be described in detail below. At present, reference point position selection method mainly includes: setting reference point to a preset position of a manual measurement in advance, or accurately measuring the distance from reference point to a certain point by ultrasonic ranging, laser ranging, and the like. However, these methods cannot directly obtain coordinates of reference point. Moreover, in places where it is difficult to perform a measurement, manual measurement is difficult and the error is greater. In order to solve the measurement error of the reference point coordinates, the present invention proposes a reverse calibration technical solution, which can automatically calibrate the reference point coordinates that need to be calibrated, send the calibrated reference point coordinates to cloud database and convert the calibrated coordinates into latitude and longitude coordinates. The relative coordinates are mapped to a GPS map. The reverse calibration technical solution proposed by the invention can accurately measure the coordinate position of a certain reference point in a certain environment. Moreover, the present invention also proposes a method of converting relative coordinates into latitude and longitude coordinates.

The reverse calibration system proposed by the present invention includes: a reverse calibrator and a cloud database. Specifically, the reverse calibrator includes a level module, a distance measuring module, an angle measuring module, and a signal processor. The level module includes a level and a tripod. The level of the tripod is adjusted by the level to make the reverse calibrator maintain an absolute level at the measuring point. The distance measuring module is used to measure a distance r from calibrator placement point to a measured point, which can be measured by laser, ultrasound, etc. The angle measurement module is used to measure azimuth angle $\theta$ and pitch angle $\partial$ of the calibrator placement point to the measured point, wherein the azimuth angle is the angle at which the measured point rotates clockwise in the north direction to the calibrator placement point and the pitch angle is the vertical angle from the measured point to the point at which the level is placed. The signal processor calculates relative coordinates of the measured point according to the distance r, azimuth angle $\theta$ and pitch angle $\partial$. The measured points include calibration points and other reference points including at least the origin of the field coordinate system and a point on an axis of the coordinate system. The signal processor can also convert the relative coordinates into latitude and longitude coordinates and send the calibrated relative coordinates and latitude and longitude coordinates to the cloud database. A calibrated device can be placed at a calibration point. The calibrated device may be an electronic device, a mechanical device, or the like. The cloud database stores a map and receives the calibration coordinates sent by the calibrator. The cloud database also maps the latitude and longitude coordinates to a predetermined map for subsequent download of smart terminals.

Figure 4:
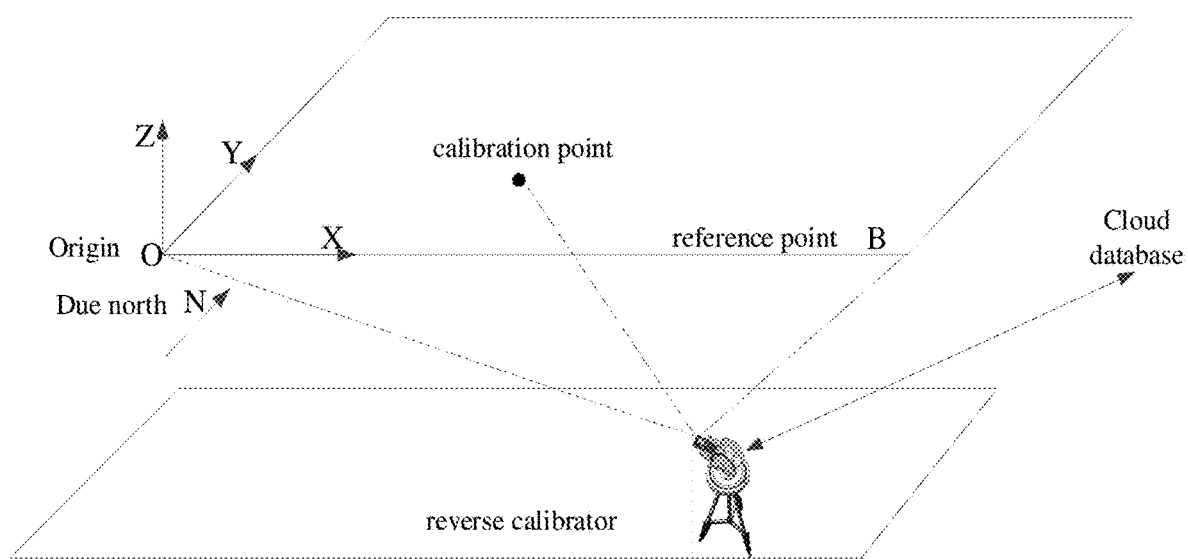
FIG. 4 is a block diagram of a reverse calibration system in accordance with an embodiment of the present invention.

FIG. 4 is a block diagram of a reverse calibration system in accordance with an embodiment of the present invention. As shown in FIG. 4, the system includes a reverse calibrator and a cloud database. The reverse calibrator is configured to measure a distance between a reverse calibrator placement point and a measured point, azimuth and pitch angle of the measured point relative to the reverse calibrator placement point. The measured points include calibration points and reference points. The reference points include a coordinate origin of the site coordinate system and a predetermined point on a number axis of the site coordinate system. The reverse calibrator is further configured to calculate relative coordinates of the predetermined point in the site coordinate system based on a distance between the coordinate origin and the reverse calibrator placement point, an azimuth angle of the coordinate origin relative to the reverse calibrator placement point, a pitch angle of the coordinate origin relative to the reverse calibrator placement point, a distance between the predetermined point and the reverse calibrator placement point, an azimuth angle of the predetermined point relative to the reverse calibrator placement point and a pitch angle of the predetermined point relative to the reverse calibrator placement point, calculate relative coordinates of the calibration point in the site coordinate system based on relative coordinates of the predetermined point in the site coordinate system, the distance between the coordinate origin and the reverse calibrator placement point, the azimuth angle of the coordinate origin relative to the reverse calibrator placement point, the pitch angle of the coordinate origin relative to the reverse calibrator placement point, the distance between the predetermined point and the reverse calibrator placement point, the azimuth angle of the predetermined point relative to the reverse calibrator placement point, the pitch angle of the predetermined point relative to the reverse calibrator placement point, the distance between the calibration point and the reverse calibrator placement point, the azimuth angle of the calibration point relative to the reverse calibrator placement point and the pitch angle of the calibration point relative to the reverse calibrator placement point, obtain latitude and longitude coordinates of the coordinate origin and latitude and longitude coordinates of the predetermined point, calculate an angle between the northward numerical axis of the field coordinate system and a geographical north according to the latitude and longitude coordinates of the coordinate origin and the latitude and longitude coordinates of the predetermined point, calculate latitude and longitude coordinates of the calibration point based on the angle between the northward numerical axis and the geographical north, The cloud database is configured to receive latitude and longitude coordinates of the calibration point from the reverse calibrator and identify latitude and longitude coordinates of the calibration point to a predetermined map.

In one embodiment, relative coordinates of a predetermined point in the site coordinate system being $(X_B, 0, 0)$, wherein $$X_B = \sqrt{(\cos\alpha_O r_O)^2 + (\cos\alpha_B r_B)^2 - 2\cos(\theta_O - \theta_B) \cdot \cos\alpha_O r_O \cdot \cos\alpha_B r_B} \;;$$

wherein relative coordinates of the coordinate origin in the site coordinate system are (0, 0, 0); the distance between the coordinate origin and the reverse calibrator placement point is $r_O$; the azimuth angle of the coordinate origin relative to the reverse calibrator placement point is $\theta_O$; the pitch angle of the coordinate origin relative to the reverse calibrator placement point is $\alpha_O$; the distance between the predetermined point and the reverse calibrator placement point is $r_B$; the azimuth angle of the predetermined point relative to the reverse calibrator placement point is $\theta_B$; the pitch angle of the predetermined point relative to the reverse calibrator placement point is $\alpha_B$; the site coordinate system comprising Y axis, X axis and Z axis and the coordinate origin, wherein the Y axis is northward in the field, and latitude and longitude coordinates of the calibration point are (W, J);
wherein $$W = W1 + \frac{Y'}{R0} * \frac{180}{\pi};$$

$$J = J1 + \frac{X'}{\cos(W1)R0} * \frac{180}{\pi};$$

$$\begin{cases} X' = \cos\gamma * X - \sin\gamma * Y \\ Y' = \sin\gamma * X + \cos\gamma * Y \end{cases};$$

R0 is an average radius of the earth; (W1, J1) is latitude and longitude coordinate of the coordinate origin; $\gamma$ is the angle between the northward axis of the site coordinate system and geographical north; (X, Y) is the relative coordinates of the calibration point in the site coordinate system.

Figure 5:
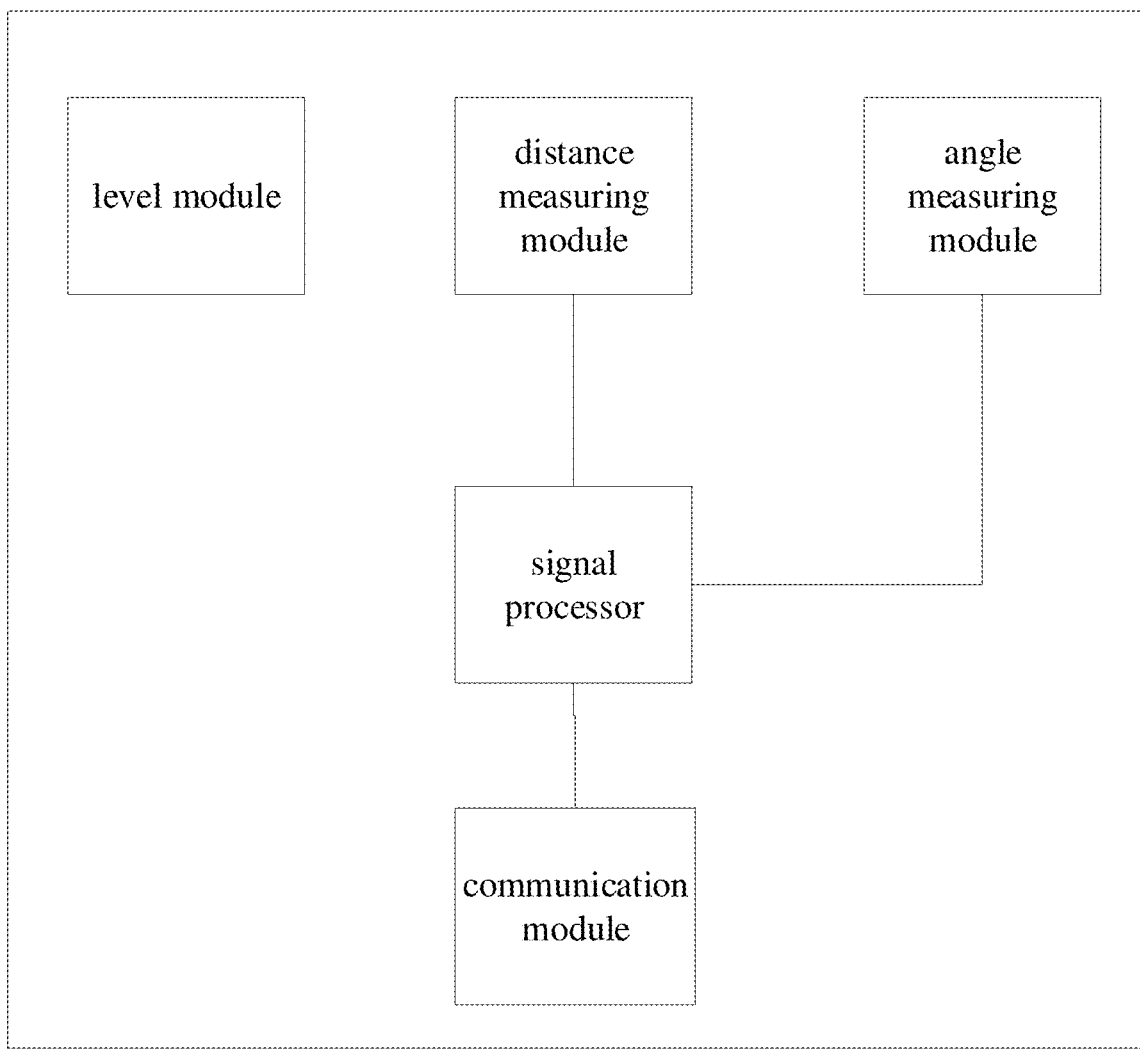
FIG. 5 is a block diagram of a reverse calibrator in accordance with an embodiment of the present invention.

FIG. 5 is a block diagram of a reverse calibrator in accordance with an embodiment of the present invention. As shown in FIG. 5, the reverse calibrator comprising: a level module, configured to maintain the reverse calibrator level during the calibration process; a distance measuring module, configured to measure a distance between a reverse calibrator placement point and a measured point, wherein the measured point includes a calibration point and a reference point, wherein the reference point includes a coordinate origin of the site coordinate system and a predetermined point on an axis of the site coordinate system, the calibration point includes arrangement point of each ultrasound generator; an angle measuring module, configured to measure azimuth angle and pitch angle of the measured point relative to the reverse calibrator placement point; a signal processor, configured to calculate relative coordinates of the predetermined point in the site coordinate system based on a distance between the coordinate origin and the reverse calibrator placement point, an azimuth angle of the coordinate origin relative to the reverse calibrator placement point, a pitch angle of the coordinate origin relative to the reverse calibrator placement point, a distance between the predetermined point and the reverse calibrator placement point, an azimuth angle of the predetermined point relative to the reverse calibrator placement point and a pitch angle of the predetermined point relative to the reverse calibrator placement point, calculate relative coordinates of the calibration point in the site coordinate system based on relative coordinates of the predetermined point in the site coordinate system, the distance between the coordinate origin and the reverse calibrator placement point, the azimuth angle of the coordinate origin relative to the reverse calibrator placement point, the pitch angle of the coordinate origin relative to the reverse calibrator placement point, the distance between the predetermined point and the reverse calibrator placement point, the azimuth angle of the predetermined point relative to the reverse calibrator placement point, the pitch angle of the predetermined point relative to the reverse calibrator placement point, the distance between the calibration point and the reverse calibrator placement point, the azimuth angle of the calibration point relative to the reverse calibrator placement point and the pitch angle of the calibration point relative to the reverse calibrator placement point.

The reverse calibrator shown in FIG. 5 can further include a communication module. The communication module is configured to send latitude and longitude coordinates of a calibration point to cloud database. Preferably, relative coordinates of the predetermined point in the site coordinate system are $(X_B, 0, 0)$, wherein $$X_B = \sqrt{(\cos\alpha_O r_O)^2 + (\cos\alpha_B r_B)^2 - 2\cos(\theta_O - \theta_B) \cdot \cos\alpha_O r_O \cdot \cos\alpha_B r_B} \;;$$

wherein relative coordinates of the coordinate origin in the site coordinate system are (0, 0, 0); the distance between the coordinate origin and the reverse calibrator placement point is $r_O$; the azimuth angle of the coordinate origin relative to the reverse calibrator placement point is $\theta_O$; the pitch angle of the coordinate origin relative to the reverse calibrator placement point is $\alpha_O$; the distance between the predetermined point and the reverse calibrator placement point is $r_B$; the azimuth angle of the predetermined point relative to the reverse calibrator placement point is $\theta_B$; the pitch angle of the predetermined point relative to the reverse calibrator placement point is $\alpha_B$.

In one embodiment, the site coordinate system comprising Y axis, X axis and Z axis and the coordinate origin, wherein the Y axis is northward in the field, and latitude and longitude coordinates of the calibration point are (W, J);
wherein $$W = W1 + \frac{Y'}{R0} * \frac{180}{\pi};$$

-continued $$J = J1 + \frac{X'}{\cos(W1)R0} * \frac{180}{\pi};$$

$$\begin{cases} X' = \cos\gamma * X - \sin\gamma * Y \\ Y' = \sin\gamma * X + \cos\gamma * Y \end{cases};$$

R0 is an average radius of the earth; (W1, J1) is latitude and longitude coordinate of the coordinate origin; $\gamma$ is the angle between the northward axis of the site coordinate system and geographical north; (X, Y) is the relative coordinates of the calibration point in the site coordinate system coordinate.

The above process of calculating the angle between northward axis of the field coordinate system and a geographical north includes: calculating projections S1 and S2 of the length OB in a latitudinal direction (due east) and a longitude direction (due north) by using latitude and longitude coordinates of O and B; and utilizing inverse tangent function finds the angle $\gamma$ between the OY axis and due north based on the positive and negative relationship of S1 and S2.

The working principle of the reverse calibration system is described in detail below.

The reverse calibration system shown in FIG. 4 can be used to calibrate coordinates of any fixed point in a room. Before calibration, a uniform coordinate system in the site should be set to measure position coordinates in the calibration point site. In the process of setting up a site coordinate system, the north direction of the selected site is the Y axis, so that the relative coordinates of the site can be converted into latitude and longitude coordinates according to angle between the O-Y axis and a geographical north. The calibration method proposed by the invention has a ranging accuracy of up to 1 mm, a horizontal azimuth and pitch angle measured at the same point with an accuracy of 0.1°, and calibration accuracy can reach 1 cm when calibration distance is within 10 m.

The specific technical points of the calibration system are as follows:

(1) Calculating Relative Coordinates of a Calibration Point(s).

In the calibration point coordinate calculation, a site coordinate system needs to be preset. For the convenience of calculation, a fixed point can be selected as coordinate origin. The field is oriented to north in the Y-axis. The X-axis and the Z-axis are perpendicular to the Y-axis. The X-axis, Y-axis and Z-axis constitute the X-Y-Z field coordinate system. During the calibration process, it is necessary to measure a distance r, azimuth angle θ and pitch angle $\partial$ from a measuring point of the calibrator to a point to be measured. Taking O point of the coordinate origin and B point on the X axis as an example, the measurement parameters of the O point are ($r_0$, $\theta_0$, $\alpha_o$), and the measurement parameters of the B point are ($r_B$, $\theta_B$, $\alpha_B$).

Figure 6:
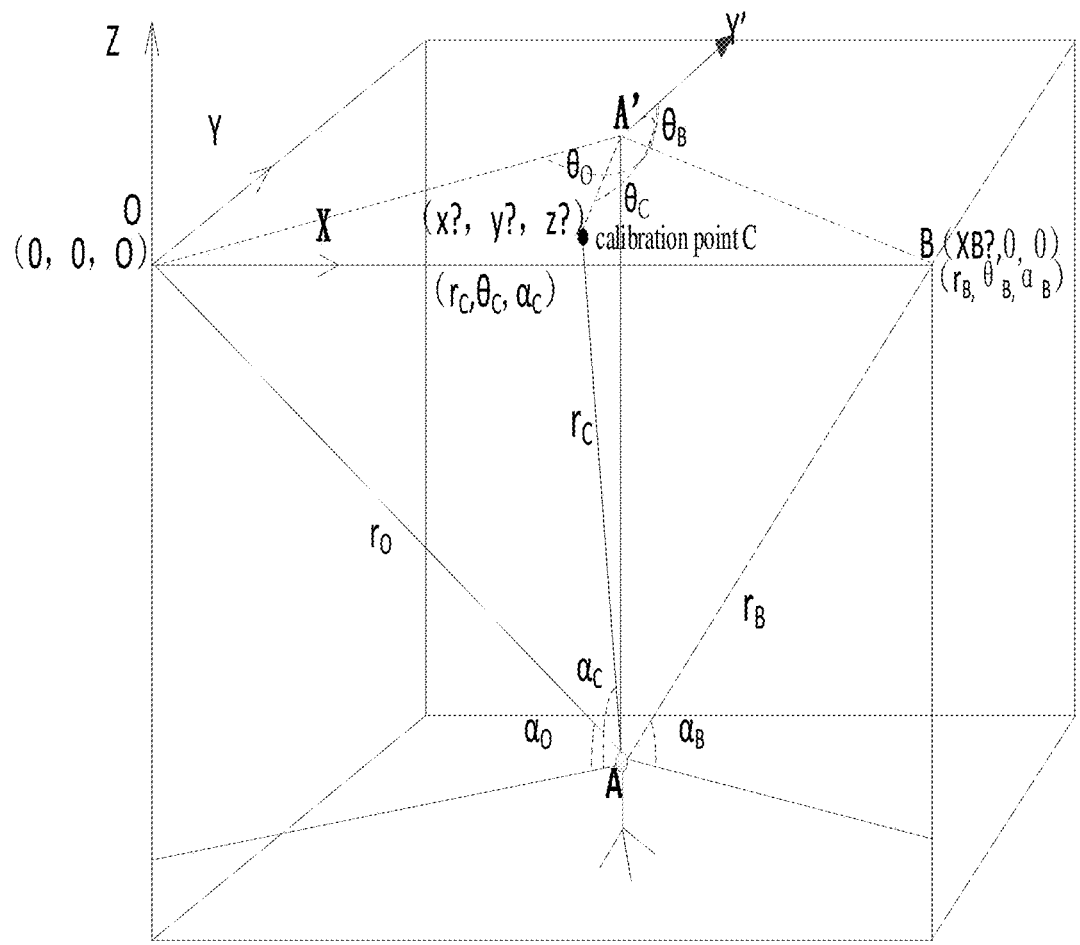
FIG. 6 is a schematic diagram of a measurement principle according to an embodiment of the present invention.

FIG. 6 is a schematic diagram of a measurement principle according to an embodiment of the present invention.

As shown in FIG. 6, the site coordinate origin O and the point B on the OX axis are selected as reference points, and the relative coordinate calculation algorithm of calibration point is as follows:

Relative coordinates of point O: (0,0,0), are known; measurement parameters of O point: ($r_0$, $\theta_0$, $\alpha_o$), are measured values; relative coordinates of point B: ($X_B$, 0, 0), are unknowns; measurement parameters of point B: ($r_B$, $\theta_B$, $\alpha_B$), are measured values; relative coordinates of calibration point C: ($X_c$, $Y_c$, $Z_c$), are unknowns; measurement parameters of calibration point C: ($r_c$, $\theta_c$, $\alpha_c$), are measured values.

Step 1: measuring distance $r_0$ of point O from measurement point A, azimuth angle $\theta_0$ of point O relative to point A, pitch angle $\partial_0$ of point O relative to point A; measuring distance $r_B$ of point B from measurement point A, azimuth angle $\theta_B$ of point B relative to point A, pitch angle $\partial_B$ of point B relative to point A; measuring distance $r_c$ of calibration point C from measurement point A, azimuth angle $\theta_c$ of point C relative to point A, and pitch angle $\partial_c$) of point C relative to point A.

Step 2: calculating the value of $x_B$ of relative coordinates of point B by the cosine theorem according to relative coordinates of point O and the measured values of point O and the point B. Let coordinates of reference point O be (0,0,0) and coordinates of point B be ($X_B$, 0, 0);

where:

$$X_B = \sqrt{(\cos\alpha_O r_O)^2 + (\cos\alpha_B r_B)^2 - 2\cos(\theta_O - \theta_B) \cdot \cos\alpha_O r_O \cdot \cos\alpha_B r_B}.$$

Step 3: calculating relative coordinates ($X_c$, $Y_c$, $Z_c$) of the calibration point C according to point O, point B, the calibrated measurement values of point C relative to point A and relative coordinates of point B. Let point O measurement parameters be ($r_0$, $\theta_0$, $\alpha_o$), point B measurement parameters be ($r_B$, $\theta_B$, $\alpha_B$), measurement parameters of calibration point C be ($r_c$, $\theta_c$, $\alpha_c$), relative coordinates of point B be ($X_B$, 0, 0), the values of $X_c$, $Y_c$, $Z_c$ in the relative coordinates of the calibration point C are also calculated according to the cosine theorem.

Example

Calculating an angle ∠A'OB according to a formula $$\angle A'OB = a\cos\left(\frac{X_B^2 + (\cos\alpha_O r_O)^2 - (\cos\alpha_B r_B)^2}{2\cos\alpha_O r_O \cdot X_B}\right),$$

based on measurement parameters of point O ($r_0$, $\theta_0$, $\alpha_o$), measurement parameters of point B ($r_B$, $\theta_B$, $\alpha_B$) and coordinates of point B($X_B$, 0, 0). And according to measurement parameters of point O ($r_0$, $\theta_0$, $\alpha_o$) and measurement parameters of point C ($r_c$, $\theta_c$, $\alpha_c$), it can be calculated:

$$OC' = \sqrt{(\cos\alpha_O r_O)^2 + (\cos\alpha_c r_c)^2 - 2\cos(\theta_O - \theta_c) \cdot \cos\alpha_O r_O \cdot \cos\alpha_c r_c}.$$

This leads to:

$$\angle A'OC' = \pm a\cos\left(\frac{Oi'^2 + (\cos\alpha_O r_O)^2 - (\cos\alpha_c r_c)^2}{2\cos\alpha_O r_O \cdot oi'}\right);$$

Since measured azimuth angles are different due to different positions of measuring points A, the values of ∠A'OC' are opposite to each other. The coordinates ($X_c$, $Y_c$, $Z_c$) in the first and second quadrants of X-Y are:

$X_c = oc' \cdot \cos(\angle A'OC' + \angle A'OB)$ $Y_c = oc' \cdot \sin(\angle A'OC' + \angle A'OB)$;

$Z_c = \sin\alpha_c r_c - \sin\alpha_o r_o$

The coordinates $(X_c, Y_c, Z_c)$ in the third and fourth quadrants of X-Y are:

$$X_c = oc' \cdot \cos(\angle A'OC' + \angle A'OB)$$

$$Y_c = -oc' \cdot \sin(\angle A'OC' + \angle A'OB)$$

$$Z_c = \sin \alpha_c r_c \cdot \sin \alpha_o r_o$$

Then, the relative coordinates of the calibration point C $(X_c, Y_c, Z_c)$ can be obtained.

(2) Coordinate Transformation

The above steps calculate relative coordinates $(X_c, X_c, Z_c)$ of calibration point C. These coordinates are only relative coordinates relative to a preset site coordinate system X-Y-Z. However, preset coordinate systems in different Sites are different. In order to map relative coordinates in different sites to a uniform coordinate system, the present invention proposes a method comprising: picking up latitude and longitude coordinates of the reference points O and B from Baidu map, and converting relative coordinates in a preset site coordinate system into latitude and longitude coordinates by a coordinate conversion algorithm.

Figure 7:
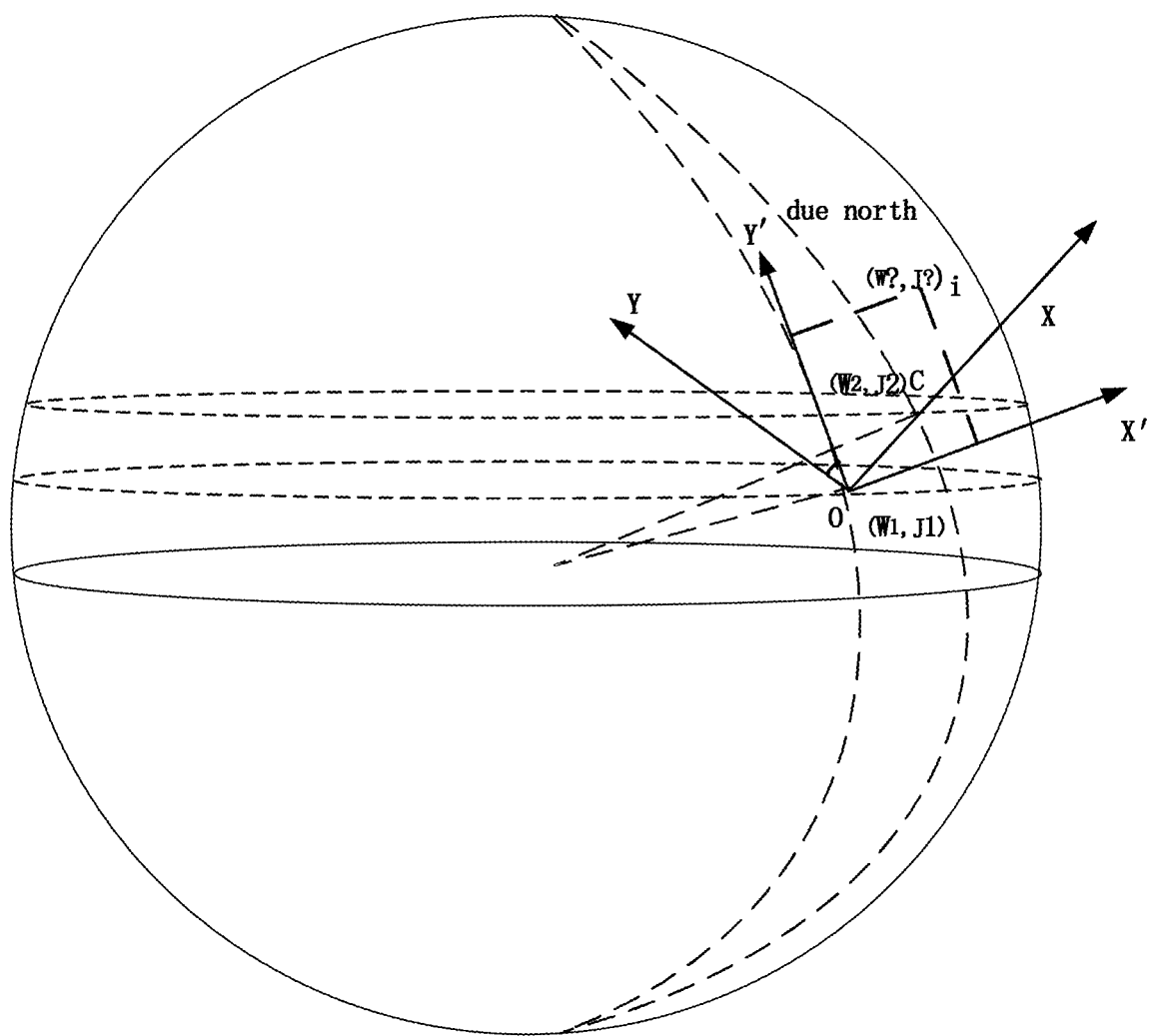
FIG. 7 is a schematic diagram of latitude and longitude coordinate conversion according to an embodiment of the present invention.

FIG. 7 is a schematic diagram of latitude and longitude coordinate conversion according to an embodiment of the present invention. Latitude and longitude coordinates of origin O in a preset site coordinate system: (W1, J1) is known; latitude and longitude coordinates of point B in the direction of the OX axis: (W2, J2) is known; latitude and longitude coordinates of calibration point C: (W, J) is unknown; relative coordinates of calibration point C: $(X_c, X_c, Z_c)$ are known; the average radius of the earth: R0 is a constant of $6.371 \times 10^6$ m; the angle between the OY axis and geographical north: $\gamma$ is unknown.

The latitude and longitude coordinate conversion algorithm of the calibration point C according to the above conditions is as follows:

Step 1: calculating angle $\gamma$ between the OY axis and the geographical north based on (W1, J1) (W2, J2), latitude and longitude coordinates of point O and point B obtained from a map software (for example, Baidu map). The process of calculating angle $\gamma$ includes: calculating projections S1 and S2 of the length OB in a latitudinal direction (due east) and a longitude direction (due north) by using latitude and longitude coordinates of O and B; and utilizing inverse tangent function finds the angle $\gamma$ between the OY axis and due north based on the positive and negative relationship of S1 and S2.

Step 2: converting the (x, y) coordinates in a field coordinate system to (x', y') in a geographic coordinates according to the angle $\gamma$ between the O-Y axis and the geographic north by a formula:

$$\begin{cases} X' = \cos\gamma * X - \sin\gamma * Y \\ Y' = \sin\gamma * X + \cos\gamma * Y \end{cases}$$

Step 3: calculating latitude and longitude coordinates (W, J) of point C based on coordinates (x', y') and latitude and longitude coordinates (W1, J1) of point O:

$$W = W1 + \frac{Y'}{R0} * \frac{180}{\pi}; J = J1 + \frac{X'}{\cos(W1)R0} * \frac{180}{\pi};$$

Wherein (W, J) are latitude and longitude coordinates of calibration point C.

The calibrated latitude and longitude coordinates can be sent to cloud database by the calibrator, and cloud database can map the coordinates to a GPS map, so that measured points in different sites are uniformly displayed in the GPS map. The above coordinate conversion method can be used for coordinate conversion of any relative coordinate in a site.

The spread spectrum process of the embodiment of the present invention will be described in detail below. Spread spectrum technology can be used to improve noise immunity. According to Shannon's theorem, in the case of harsh (eg, low SNR) communication conditions, the signal bandwidth needs to be increased to maintain or improve communication performance. Spread spectrum technology spreads signal over a wide frequency band and uses correlation detection at the receiving end to restore useful signal to a narrowband signal. For an interference signal, since it is not related to spreading code, after being spread into a wideband signal through narrowband filtering, the interference power entering the frequency band of the useful signal is reduced, and accordingly the signal-to-noise ratio of the output of correlator is also increased. The embodiment of the invention applies spread spectrum technology to ultrasound positioning system, not only improves the anti-noise performance of the system, but also uses an improved spreading code for detecting the ultrasound delay time, thereby realizing precise positioning and speed measurement of a moving object. The spreading code used in spread spectrum technique is actually a pseudo-random sequence which can be artificially generated and copied. It is a sequence that is determined but "randomly" generated. Nowadays, a pseudo-random sequence that is often used is the m-sequence. The m-sequence is widely used due to its easy generation and strong regularity. The pseudo-random sequence derived from the m-sequence includes a Gold sequence, an M sequence, and the like. Existing spread spectrum code m sequences do not have fully ideal autocorrelation properties, and in code division multiple access communication, cross-correlation codes of different addresses are required to have small cross-correlation. The random sequence proposed by the present invention is well improved on the basis of the m sequence. The improved sequence has better autocorrelation and does not affect code division multiple access communication.

The present disclosure proposes an ultrasound ranging and speed measuring method using a spreading code. The method can be applied to position detection of mobile or stationary devices and associated persons. More preferably, the present invention also proposes an improved spreading code which can accurately detect ultrasound delay time in an acoustic positioning system and improve positioning accuracy of the acoustic positioning system for moving objects, because of its good autocorrelation. Based on spread spectrum technology, a method for determining state parameter of a measured object includes: generating a carrier signal in a ultrasound transmitting end, multiplying the carrier signal with a spread spectrum pseudo random code in the ultrasound transmitting end to obtain an ultrasound ranging signal, emitting the ultrasound ranging signal and extracting ultrasound characteristic parameters of the emitted wave ranging signal in the ultrasound transmitting end; capturing the ultrasound ranging signal in ultrasound receiving end, extracting ultrasound characteristic parameters of captured wave ranging signal in the ultrasound receiving end; detecting state parameter of the measured object based on the ultrasound characteristic parameter of the ultrasound transmitting end and the ultrasound characteristic parameter of the ultrasound receiving end.

Here, the state parameter of measured object may include: a moving speed of measured object, a distance between measured object and sound emitting end, a coordinate of measured object, an ambient temperature of measured object, and the like. The acoustic characteristic parameter of the ultrasound transmitting end may be a frequency or period of the ultrasound ranging signal emitted by the ultrasound transmitting end. The ultrasound characteristic parameter of the ultrasound receiving end may be a frequency or period of the ultrasound ranging signal captured by the ultrasound receiving end. The acoustic characteristic parameter of the ultrasound transmitting end and the ultrasound characteristic parameters of the ultrasound receiving end should have a same acoustic characteristic characteristics, for example, both for frequency or both for period.

In one embodiment, the ultrasound transmitting end and the ultrasound receiving end are configured in a same device to collectively constitute a single-ended system. In one embodiment, the ultrasound transmitting end and the ultrasound receiving end are configured in different devices to collectively constitute a double-ended system.

In one embodiment, the spread-spectrum pseudo-random code is an m-sequence or a pseudo-random sequence derived from m-sequence; or the spread-spectrum pseudo-random code is obtained based on the following steps: configuring m sequence of length ($2^n$-1), where n is a positive integer;

extending the m sequence of length ($2^n$-1) to m sequence of length $2^n$;

generating M sequence based on m sequence of length $2^n$, M=FFT(1-2 m), where FFT is fast Fourier transform function;

generating a M' sequence of length $2^n$ based on the M sequence according to a formula $$M'[k] = \begin{cases} M[k] & 1 \le k \le 2^{n-1} - 1 \\ \text{abs} M[1] & k = 2^{n-1} \\ M[k-1] & 2^{n-1} + 1 \le k \le 2^n \end{cases},$$

wherein k is a point number, abs is an absolute value function;

performing an inverse fast Fourier transform on the M' sequence of length $2^n$ to generate an m' sequence as the pseudorandom code.

In one embodiment, the method comprising: converting the length of the ultrasonic ranging signal captured by the ultrasound receiving end to the same length as the ultrasonic ranging signal emitted by the ultrasound transmitting end, by up sampling or down sampling; performing a cross-correlation operation based on the ultrasonic ranging signal emitted by the ultrasound transmitting end and the length-converted ultrasonic ranging signal to obtain a cross-correlation sequence; finding a position corresponding to a maximum correlation value in the cross-correlation sequence; calculating the ultrasonic delay time based on the position corresponding to the maximum correlation value in the cross-correlation sequence, the acoustic characteristic parameter of the ultrasound transmitting end and the ultrasound characteristic parameters of the ultrasound receiving end Here, when the ultrasound receiving end is synchronized with the ultrasound transmitting end clock, the ultrasound delay time is a difference between the time at which the ultrasound receiving end receives the ultrasound ranging signal and the time at which the ultrasound transmitting end transmits the ultrasound ranging signal. When the ultrasound receiving end is not synchronized with the ultrasound transmitting end clock, the ultrasound delay time determined by the above method can be used to determine the pseudo range between the receiving end and the transmitting end. In one embodiment, when the ultrasound transmitting end is located in a same device as the ultrasound receiving end, the distance L between a measured object and the ultrasound transmitting end is calculated, where L=C*ΔT/2, and ΔT is the ultrasound delay time, C is the propagation speed of ultrasounds in the air. When the ultrasound transmitting end and the ultrasound receiving end are located in different devices, calculate the distance between a measured object and the ultrasound transmitting end, where L=C*ΔT, ΔT is the ultrasound delay time, C is the propagation speed of the ultrasound in the air.

In one embodiment, there are three ultrasound transmitting ends and all the ultrasound transmitting ends are kept in clock synchronization with the ultrasound receiving end. The distance between the first ultrasound transmitting end and the measured object is L1, the distance between the measured objects and the second ultrasound transmitting end is L2, and the distance between the third ultrasound transmitting end and the measured object is L3, the coordinates of the first ultrasound transmitting end are (x1, y1, z1), the coordinates of the second ultrasound transmitting end are (x2, y2, z2), and the coordinates of the third ultrasound transmitting end are (x3, y3, z3), and C is the propagation speed of the ultrasound in the air; the method includes: determining the coordinates (x, y, z) of the measured object and a moving velocity V of the measured object based on the following equations:

$$\begin{cases} L1 = [(x-x1)^2 + (y-y1)^2 + (z-z1)^2]^{\frac{1}{2}} \\ L2 = [(x-x2)^2 + (y-y2)^2 + (z-z2)^2]^{\frac{1}{2}} \\ L3 = [(x-x3)^2 + (y-y3)^2 + (z-z3)^2]^{\frac{1}{2}} \\ V = C*\left(\frac{Tt}{Tr} - 1\right) \end{cases};$$

Where Tt is the acoustic characteristic parameter of the ultrasound transmitting end, and Tr is the ultrasound characteristic parameter of the ultrasound receiving end.

In one embodiment, there are four ultrasound transmitting ends and all the ultrasound transmitting ends are kept in clock synchronization with the ultrasound receiving end, and the distance between the first ultrasound transmitting end and the measured object is L1, the distance between the first ultrasound transmitting end and the measured object is L2, the distance between the third ultrasound transmitting end and the measured object is L3, and the distance between the fourth ultrasound transmitting end and the measured object is L4. The coordinates of the first ultrasound transmitting end are (x1, y1, z1), the coordinates of the second ultrasound transmitting end are (x2, y2, z2), the coordinates of the third ultrasound transmitting end are (x3, y3, z3), and the coordinates of the fourth ultrasound transmitting end are (x4, y4, z4), and C is the propagation speed of ultrasounds in the air. The method includes: determining coordinates (x, y, z) of the measured object, moving velocity V of the measured object, and an ambient temperature T of the measured object based on the following system of equations:

$$\begin{cases} L1 = [(x-x1)^2 + (y-y1)^2 + (z-z1)^2]^{\frac{1}{2}} \\ L2 = [(x-x2)^2 + (y-y2)^2 + (z-z2)^2]^{\frac{1}{2}} \\ L3 = [(x-x3)^2 + (y-y3)^2 + (z-z3)^2]^{\frac{1}{2}} \\ L4 = [(x-x4)^2 + (y-y4)^2 + (z-z4)^2]^{\frac{1}{2}} \\ V = C*\left(\frac{Tt}{Tr} - 1\right) \\ C = C0 + 0.607*T \end{cases}$$

Where Tt is the acoustic characteristic parameter of the ultrasound transmitting end, Tr is the acoustic characteristic parameter of the ultrasound receiving end; C0 is the ultrasound velocity when the temperature is zero degree.

In one embodiment, there are four ultrasound transmitting ends and not all ultrasound transmitting ends and the ultrasound receiving end are kept in clock synchronization, and the distance between the first ultrasound transmitting end and the measured object is L1, the distance between the first ultrasound transmitting end and the measured object is L2, the distance between the third ultrasound transmitting end and the measured object is L3, and the distance between the fourth ultrasound transmitting end and the measured object is L4. The coordinates of the first ultrasound transmitting end are (x1, y1, z1), the coordinates of the second ultrasound transmitting end are (x2, y2, z2), the coordinates of the third ultrasound transmitting end are (x3, y3, z3), and the coordinates of the fourth ultrasound transmitting end are (x4, y4, z4), and C is the propagation speed of ultrasounds in the air;

The method includes: determining coordinates (x, y, z) of the measured object and moving velocity V of the measured object based on the following system of equations:

$$\begin{cases} L1 = [(x-x1)^2 + (y-y1)^2 + (z-z1)^2]^{\frac{1}{2}} \\ L2 = [(x-x2)^2 + (y-y2)^2 + (z-z2)^2]^{\frac{1}{2}} \\ L3 = [(x-x3)^2 + (y-y3)^2 + (z-z3)^2]^{\frac{1}{2}} \\ L4 = [(x-x4)^2 + (y-y4)^2 + (z-z4)^2]^{\frac{1}{2}} \\ V = C*\left(\frac{Tt}{Tr} - 1\right) \end{cases}$$

Where Tt is the ultrasound characteristic parameter of the ultrasound transmitting end, Tr is the ultrasound characteristic parameter of the ultrasound receiving end; r0 is the distance error caused by no clock synchronization.

In one embodiment, there are five ultrasound transmitting ends and not all ultrasound transmitting ends and the ultrasound receiving end are kept in clock synchronization, and the distance between the first ultrasound transmitting end and the measured object is L1, the distance between the first ultrasound transmitting end and the measured object is L2, the distance between the third ultrasound transmitting end and the measured object is L3, the distance between the fourth ultrasound transmitting end and the measured object is L4, and the distance between the fifth ultrasound transmitting end and the measured object is L5. The coordinates of the first ultrasound transmitting end are (x1, y1, z1), the coordinates of the second ultrasound transmitting end are (x2, y2, z2), the coordinates of the third ultrasound transmitting end are (x3, y3, z3), the coordinates of the fourth ultrasound transmitting end are (x4, y4, z4), and the coordinates of the fifth ultrasound transmitting end are (x5, y5, z5), and C is the propagation speed of ultrasounds in the air.

The method includes: determining coordinates (x, y, z) of the measured object, moving velocity V of the measured object and an ambient temperature T of the measured object based on the following system of equations:

$$\begin{cases} L1 = [(x-x1)^2 + (y-y1)^2 + (z-z1)^2]^{\frac{1}{2}} \\ L2 = [(x-x2)^2 + (y-y2)^2 + (z-z2)^2]^{\frac{1}{2}} \\ L3 = [(x-x3)^2 + (y-y3)^2 + (z-z3)^2]^{\frac{1}{2}} \\ L4 = [(x-x4)^2 + (y-y4)^2 + (z-z4)^2]^{\frac{1}{2}} \\ L5 = [(x-x5)^2 + (y-y5)^2 + (z-z5)^2]^{\frac{1}{2}} \\ V = C*\left(\frac{Tt}{Tr} - 1\right) \\ C = C0 + 0.607*T \end{cases}$$

Where Tt is the acoustic characteristic parameter of the ultrasound transmitting end, Tr is the ultrasound characteristic parameter of the ultrasound receiving end; r0 is the distance error caused by no clock synchronization; C0 is the ultrasound velocity when the temperature is zero degree.

Figure 8:
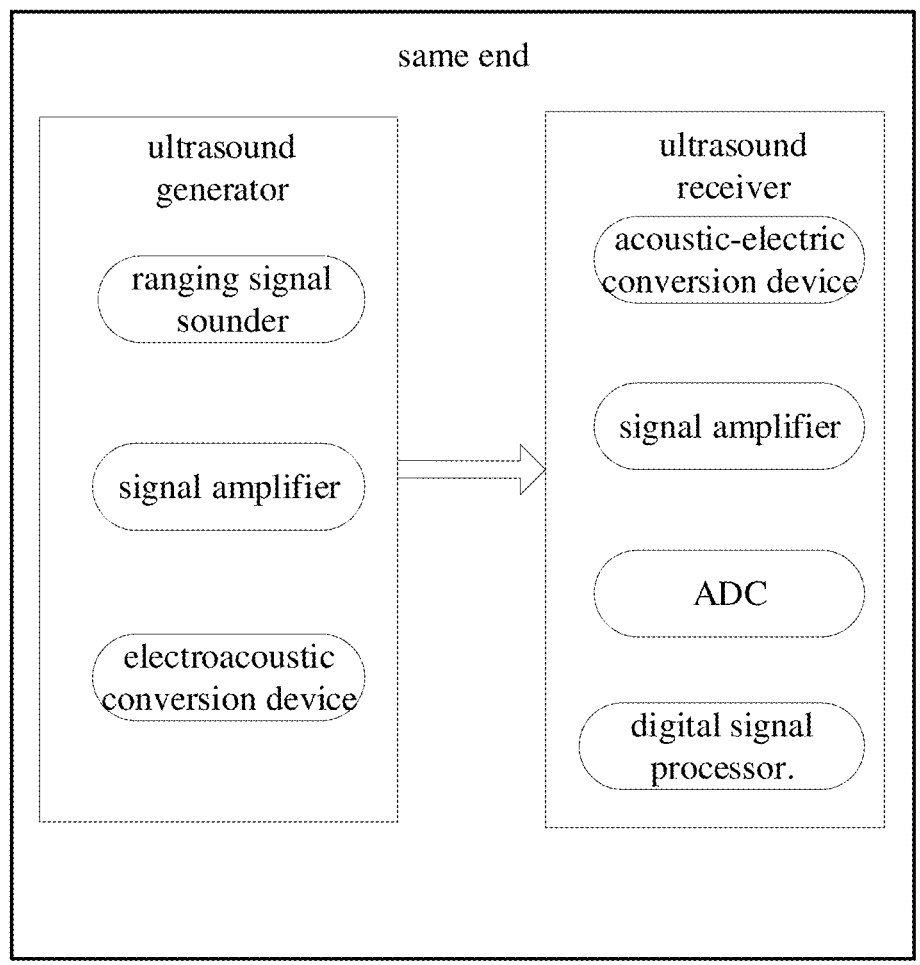
FIG. 8 is a schematic illustration of a single-ended system in accordance with the present invention.

The invention provides a precise ranging speed measuring method of spread spectrum technology. Depending on the number of ultrasound generators and ultrasonic receivers and the equipment in which they are located, the system can be divided into single-ended systems and two-terminal systems. FIG. 8 is a schematic illustration of a single-ended system in accordance with the present invention. A single-ended system is a system with only one device. A single-ended system contains at least one ultrasound generator and at least one ultrasound receiver. The ultrasound generator and ultrasound receiver are located on the same device. In FIG. 8, an ultrasound generator is used to generate an ultrasound, an ultrasound receiver is used to receive an ultrasound, and the ultrasound generator and the ultrasound receiver have a synchronous clock. The ultrasound generator unit includes: a ranging signal sounder, a signal amplifier, and an electroacoustic conversion device. The ultrasound receiver unit includes: an acoustic-electric conversion device, a signal amplifier, an ADC, and a digital signal processor.

Figure 9:
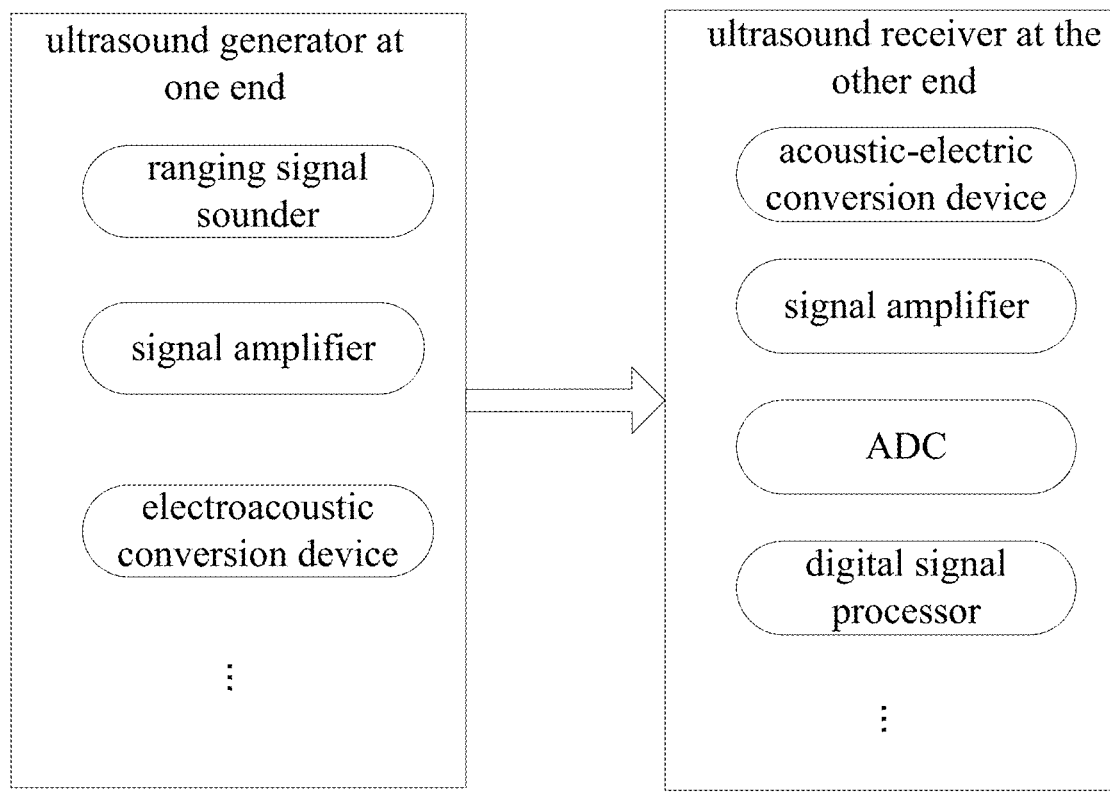
FIG. 9 is a schematic illustration of a double-ended system in accordance with the present invention.

FIG. 9 is a schematic illustration of a double-ended system in accordance with the present invention. A double-ended system is a system that contains at least two devices. The double-ended system has at least one ultrasound generator at one end and at least one ultrasound receiver at the other end. For double-ended systems, the ultrasound generator and ultrasound receiver are located on different devices. The clock generator mechanism can be provided between the sound generator and the receiver of the double-ended system, or the clock synchronization mechanism is not provided.

In FIG. 9, an ultrasound generator is used to generate an ultrasound; an ultrasound receiver is used to receive an ultrasound; the ultrasound generator unit includes: a ranging signal sounder, a signal amplifier, and an electroacoustic conversion device; the ultrasound receiver unit includes: an acoustic-electric conversion device, signal amplifiers, ADCs, and digital signal processors.

According to the characteristics of the single-ended system and the double-ended system, the distance between the two objects is calculated as follows:

(1) When a single-ended system is set at a reference point, the system has both a ultrasound generator and a ultrasound receiver. The ultrasound emitted by the generator reaches a measured object and generates an echo. The echo finally arrives at the receiver and is detected by the system. The system calculates the time ΔT from the moment the ultrasound is emitted to the moment when the ultrasound arrives at the receiver. Since the ultrasound propagates at the velocity C throughout the process, the distance L between the two can be calculated as "L=(C*ΔT)/2".

(2) When implemented as a double-ended system, the ultrasound generator is set at a reference point, and the receiver is set on an object to be measured. The ultrasound emitted by the ultrasound generator reaches the object to be measured after a period of time. The system detects the time ΔT of the ultrasound propagation process, and the distance between the two can be calculated: "L=C*ΔT".

(3) In another kind of double-ended system, an ultrasound generator is arranged on the object to be measured, and an ultrasound receiver is arranged at a reference point. Similar to the case of (2), the system detects the time ΔT of the ultrasound propagation process, and the distance L between the two is calculated by "L=C*ΔT".

For both single-ended systems and double-ended systems, when the receiving end is stationary relative to the ultrasound generating end, the ultrasound frequency observed at the receiving end does not change, but the receiving end has motion relative to the sound generating end. When the distance decreases, the receiving frequency becomes higher, and when the distance increases, the distance increases. The receiving frequency becomes lower, which is the Doppler Effect. The Doppler Effect directly reflects the change of the carrier frequency at the receiving end, and the degree of frequency change is proportional to the relative motion speed of the receiving end. When an moving object moves closer to the transmitting end, the observed frequency increases, the wavelength becomes shorter, the frequency offset decreases, and the frequency offset changes. When the moving direction of the moving object moves away from the transmitting end, the result is reversed, and the frequency is observed to decrease. The wavelength becomes longer, the frequency offset increases, and the frequency offset changes. When the moving object frequently changes the distance between the transmitting end and the transmitting end, the frequency shift phenomenon is very serious, and the faster the relative motion speed, the greater the influence.

According to the Doppler Effect, when measured object moves, the velocity V of the measured object relative to the reference point has the following algorithm:

A parameter (period of the periodic signal, duration of a spreading code, etc.) characterizing the duration of a particular signal segment is implanted in the above acoustic signal. If the parameter in the signal acquired by the receiving end reflects the duration is equal to the original value, there is no relative motion between the transmitting end and the receiving end. If there is relative motion between the two, the Doppler Effect will cause the value observed by the transmitting end and the receiving end to be different. The moving speed of the measured object relative to the reference point can be calculated according to the offset. The observation value of the characteristic parameter at the transmitting end is represented by Tt, and the observation value of the characteristic parameter at the receiving end is represented by Tr. The characteristic parameter herein is generally a period or a frequency, and the characteristic parameter in the embodiment of the present invention is represented by a frequency. V represents the moving speed of the measured object relative to the reference point (positive when the measured object and the reference point are gradually approaching, negative when the two are gradually moving away). Finally, the velocity of the measured object relative to the reference point, that is V, can be calculated according to a formula $$V = C\left(\frac{Tt}{Tr} - 1\right),$$

and C is the transmission rate of the ultrasound in the air, which is a constant.

When detecting the moving speed of the measured object relative to the sound emitting end, the characteristic parameter Tr used by the receiving end can be obtained by detecting the ultrasound frequency offset. The detection frequency offset can be realized by a Phase Locked Loop (PLL) or a Costas Loop of closed loop automatic adjustment system.

According to the above-mentioned single-ended system and double-ended system ranging method, the distance between two objects is proportional to the ultrasound transmission rate and the ultrasound transmission time. The ultrasound transmission rate is a constant C, and the delay between the moment an ultrasound signal is emitted and the moment the ultrasound signal is detected can be acquired through the following algorithm.

The transmitting end circulates an ultrasound ranging signal x0 of the time length N0 through an electro-acoustic conversion device, and the receiving end captures a signal x01 with a duration of N1, wherein N1>N0, wherein the selection of (N1−N0)/N0 depends on the coverage of the Doppler Effect.

The digital signal processor performs the following calculations to obtain the delay:

Step 1. Extracting a signal x02 corresponding to $$N1 = N0 * \frac{Tr}{Tt}$$

from x01 according to the Doppler frequency offset information. Converting the length of x02 to N0 by up Sampling or Down Sampling to obtain x03.

If N1<N0, the signal x02 is sampled by up sampling method to obtain x03 of the signal length N1=N0. If N1>N0, the signal x02 is sampled by down sampling method to obtain x03 of the signal length N1=N0.

Up Sampling is the process of interpolating a sequence of samples so that the new sequence is the upsampling of the original sequence. Down Sampling is to sample a sample of a sample interval at intervals, so that the new sequence is the downsampling of the original sequence.

Step2. Converting x0 and x03 to baseband signals to obtain X0 and X1.

Step3. Obtaining the signal spectrum of X0 and X1 by Fourier transform:
F0=FFT(X0);
F1=FFT(X1);

Step4. Performing generalized cross-correlation (GCC) operation on the above signal spectra F0 and F1, to obtain the cross-correlation sequence corr(X0, X1) of X0 and X1 according to a formula:

Corr(X0,X1)=IFFT(w*conj(F0)*F1)

Where conj( ) is a conjugate operation and w is a real-valued weighting function used to enhance the peaks in the cross-correlation sequence and the noise immunity of the above algorithm.

Step5. Finding the position $N_{max}$ corresponding to the maximum correlation value in corr(X0, X1) (setting $N_{max}=0$ corresponds to the maximum value in the first place). The acoustic signal delay time is:

$$\Delta T = \frac{N\max}{Fs} * \frac{Tt}{Tr};$$

Where $$\frac{Tt}{Tr}$$

is a correction factor to make $\Delta T$ more accurate. Tt represents the observed value of the characteristic parameters of the acoustic signal at the transmitting end, Tr represents the observed value of the characteristic parameters of the acoustic signal at the receiving end and Fs represents the sampling rate of the acoustic signal.

In order to improve the anti-interference ability of signal transmission, the spread spectrum technology is used to process the transmitted acoustic ranging signal, and the following methods can be performed:

The acoustic ranging signal x[n] is a product of a spreading code and a carrier signal, and the carrier signal can be implemented as a sine function of frequency fo, wherein:

$$x[n]=p[n]*\sin(2\pi*f0*t[n])$$

Where p[n] is a spread-spectrum pseudo-random code, which can be used as follows:

(1). m sequence and its derived pseudo-random sequence (Gold Codes, etc.), wherein m sequence is a commonly used input signal in engineering.

(2). Improved m sequence m sequence does not have fully ideal autocorrelation properties, and its length is not convenient for digital processing of signals (FFT requires that the sequence length be $2^n$, and the length of the m sequence is $(2^n-1)$.

The improved spreading code proposed by the embodiment of the present invention is obtained by the following steps:

Step1: configuring an m sequence with the length of $((2^n-1))$ according to an actual application, and extending the length of the m sequence to $(2^n)$.

Step2: performing Fourier transform on the extended m sequence in the step 1 to generate an M sequence according to a formula M=FFT(1-2 m).

Step3: Generating a new M' sequence of length $2^n$ based on the M sequence:

$$M'[1]=\text{abs}(M[1])$$

$$M'[2^{n-1}]=\text{abs}(M[1])$$

Then there are:

$$M'[k] = \begin{cases} M[k] & 1 \leq k \leq 2^{n-1}-1 \\ \text{abs}M[1] & k=2^{n-1} \\ M[k-1] & 2^{n-1}+1 \leq k \leq 2^n \end{cases}$$

Step4: calculating m' according to a formula m'=IFFTM'.
Thus, a pseudo-random sequence p(n)=m' is obtained, and the sequence length is $2^n$, and the transmission ranging acoustic signal x[n] is obtained.

Through the above algorithm, the ultrasound ranging accuracy is very high, and the anti-interference ability is strong, and can be widely applied to many positioning systems.

In the following description, the end to be positioned will be referred to as a mobile device, and the other end will be referred to as a fixed device, although the present invention does not limit the motion state of device. Fixed devices are required to have multiple acoustic wave transmitting or receiving units except one-dimensional positioning. For example, two-dimensional positioning requires two, three-dimensional positioning requires three. If the clock between the fixed device and the mobile device is not synchronized, you need to add another one.

The distance and velocity detection between two end-points can be directly implemented by the above method. In a three-dimensional space, one case is that the fixed end transmits a signal, and the mobile end receives a signal. The specific position, speed, and ambient temperature of the mobile end can be calculated. Since ambient temperature has a definite relationship with the speed of sound, ambient temperature can be derived from the speed of sound.

(1) When transmitting end is synchronized with receiving end:

Implementation (1), calculating specific location of the mobile terminal:

At least three transmitting units on the fixed end are in a fixed position, and the receiving unit calculates a pseudo distance from the transmitting unit, and then obtains its own position through a Triangulation algorithm. The specific algorithm is as follows:

The position of the transmitting unit: $(x_i, y_i, z_i)$ where i=1, 2, 3;

The location of the receiving unit: (x, y, z);

Signal delay time: $\Delta T$;

Ultrasound transmission rate: C is a constant, the transmission rate of ultrasounds at room temperature;

The relationship between pseudo range and distance: $L_i=[(x-x_i)^2+(y-y_i)^2+(z-z_i)2]12$; where i=1, 2, 3;

(x, y, z) can be calculated based on the above three equations, that is, the specific position information of the measured object can be obtained.

Implementation (2), calculating moving speed of the mobile side:

Ultrasound transmission rate: C is a constant, the transmission rate of ultrasounds at room temperature;

Observation value of the characteristic parameters of the acoustic signal at the transmitting end: Tt;

Observation value of the acoustic signal characteristic parameter at the receiving end: Tr;

Moving speed of the moving end relative to the reference point:

$$V = C\left(\frac{Tt}{Tr} - 1\right).$$

Implementation (3), calculating the ambient temperature:

At least four transmitting units on the fixed end are in a fixed position. According to the Triangulation algorithm, the position of the transmitting unit: $(x_i, y_i, z_i)$ where i=1, 2, 3, 4; the position of the receiving unit: (x, y, z); Signal delay time: $\Delta T$; ultrasound transmission rate: C is unknown; ambient temperature: T; pseudo range of receiving unit relative to the transmitting unit: $L_i=C*\Delta T$.

The relationship between pseudo range and distance includes the following four equations:

$$Li = [(x-xi)^2 + (y-yi)^2 + (z-zi)^2]^{\frac{1}{2}},$$

where i=1, 2, 3, 4;

The relationship between the ambient temperature and the acoustic velocity has the following equation: C=C0+ 0.607*T, where the acoustic velocity is 332 m/s when C0 is Zero degrees Celsius.

The above five equations can solve the value of the ambient temperature T.

(2) When the transmitting end and the receiving end are out of sync:

At least four transmitting units on the fixed end are in a fixed position, and the receiving unit calculates a pseudo distance from the transmitting unit, and then obtains its own position through the Triangulation algorithm. Once this position is known, the coordinate relationship between the mobile end and the fixed end is known, so that the velocity vector of the mobile end relative to a selected coordinate system can be calculated.

Implementation (1), calculating a specific location of the mobile terminal:

Position of the transmitting unit: (xi, yi, zi) where i=1, 2, 3, 4; position of the receiving unit: (x, y, z); signal delay time: $\Delta T$; ultrasound transmission rate: C is a constant, which is the transmission rate of ultrasounds at room temperature; the pseudo range of the receiving unit relative to the transmitting unit: Li=C*$\Delta T$.

The relationship between pseudo range and distance:

$$Li = r0 + [(x-xi)^2 + (y-yi)^2 + (z-zi)^2]^{\frac{1}{2}},$$

where i=1, 2, 3, 4.

In the above formula, R0 is unknown due to the fact that the two ends of the system do not share same clock.

There are 4 pending variables (x, y, z, ro) in the above equations, and all pending variables can be calculated by obtaining 4 signal delays. This gives the specific position information (x, y, z) of the moving object.

Implementation (2), calculating moving speed of the mobile end:

Ultrasound transmission rate: C is a constant, the transmission rate of ultrasounds at room temperature; the observation value of the characteristic parameters of the ultrasound signal at the transmitting end: Tt; the characteristic value of the ultrasound signal at the receiving end: Tr; the moving speed of the moving end relative to the reference point:

$$V = C\left(\frac{Tt}{Tr} - 1\right).$$

Implementation (3), calculating ambient temperature:

Position of the transmitting unit: (xi, yi, zi) where i=1, 2, 3, 4, 5; position of the receiving unit: (x, y, z); signal delay time: $\Delta T$; ultrasound transmission rate: C Where C is unknown; ambient temperature: T.

The pseudo range of the receiving unit relative to the transmitting unit: Li=C*$\Delta T$;

Relationship between pseudo range and physical distance: Li=r0+[(x-xi)$^2$+y-yi2+(z-zi)2]12, where i=1, 2, 3, 4.

The relationship between ambient temperature and acoustic velocity: C=C0+0.607*T, where the acoustic velocity C0 is 332 m/s when ambient temperature is zero degrees Celsius.

In the above formula, r0 is unknown due to the fact that the two ends of the system do not share same clock.

There are 5 pending variables (x, y, z, ro, T) in the above equations, and all the pending variables can be calculated by obtaining 5 signal delays.

In a three-dimensional space, another case is that the mobile terminal transmits a signal, and the fixed terminal receives the signal, and calculates the position, speed, and environmental parameters of the mobile terminal. The fixed end has at least 5 receiving units in a fixed position, the mobile end emits an ultrasound ranging signal and the fixed end receives the signal to calculate a pseudo range relative to the transmitting unit, and then obtains the position of the mobile end by the above Triangulation algorithm.

According to the above-mentioned reverse calibration of the relative coordinates of the ultrasonic signal transmitter, the spread spectrum technology processes the transmitted ultrasound ranging signal, and the delay time detection of the acoustic signal can improve the positioning accuracy of the positioned object.

Figure 10:
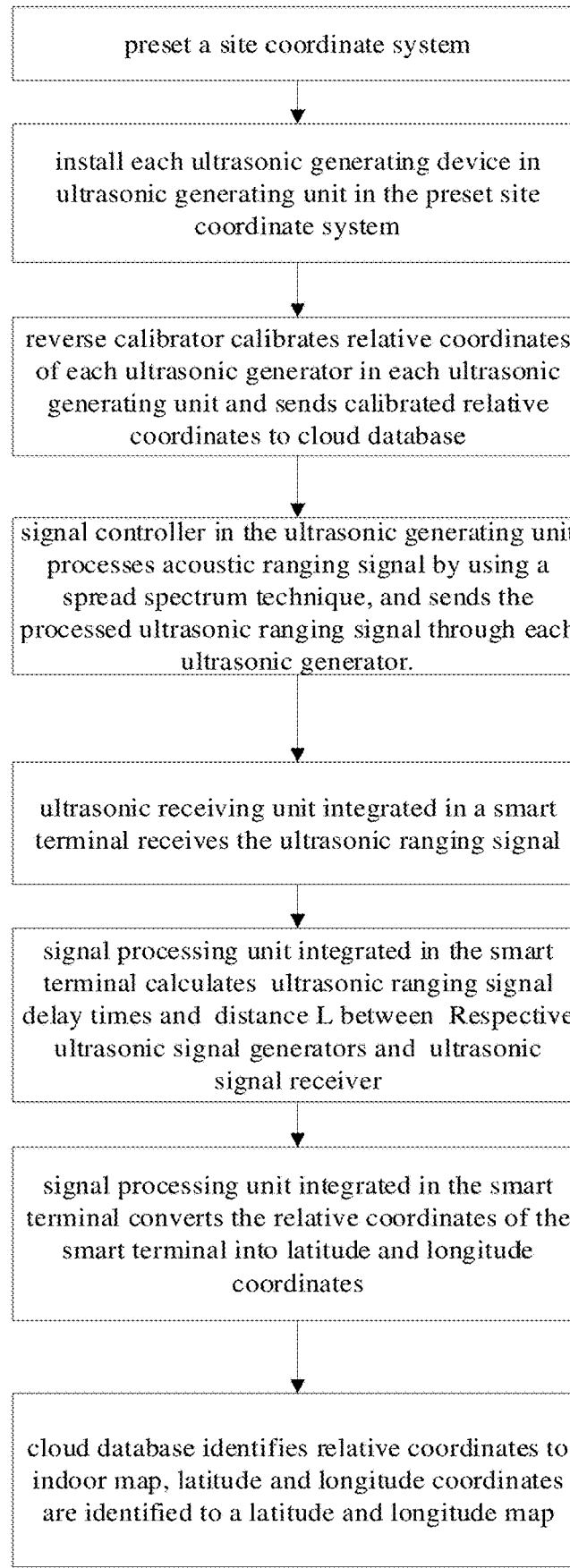
FIG. 10 is an exemplary flow chart of a positioning process including reverse calibration and spread spectrum processing in accordance with the present invention.

An exemplary process for calculating the coordinates of the positioned object is described below. FIG. 10 is an exemplary flow chart of a positioning process including reverse calibration and spread spectrum, the method comprising:

Step1: Preset a site coordinate system. For convenience of calculation, we can select a fixed point as coordinate origin, the Y-axis is northward and the two directions perpendicular to the Y-axis are the X-axis and the Z-axis, forming a X-Y-Z field coordinate system. Set up a cloud database which stores indoor maps, Baidu maps and information such as the ID of each signal transmitter.

Step2: Install each ultrasound generating device in the ultrasound generating unit in the preset site coordinate system. Multiple ultrasound generating units can be installed in the preset site according to the size of the area.

Step3: Reverse calibrator calibrates the relative coordinates of each ultrasound generator in each ultrasound generating unit according to a reverse calibration algorithm. If ultrasound generators in the ultrasound generating unit are irregularly distributed, it is necessary to calibrate the relative coordinates of each ultrasound generator. If ultrasound generators are regularly distributed over a fixed geometry, only one of the generators needs to be calibrated, and the coordinates of the other generators in the ultrasound generating unit can be calculated from the coordinates and geometric relationships of the calibrated generator. The reverse calibrator sends the calibrated relative coordinates to the cloud database.

Step4: The signal controller in the ultrasound generating unit processes the acoustic ranging signal by using a spread spectrum technique, and sends the processed ultrasonic ranging signal through each ultrasound generator.

Step5: The ultrasound receiving unit integrated in a smart terminal receives the ultrasonic ranging signals, and obtains the relative coordinates (x1, y1, z1) (x2, y2, z2) (X3, y3, z3), (x4, y4, z4) of each ultrasound generator from the cloud and other measurement parameters (such as measurement parameters of reference points, etc.), according to the ID information in the ultrasonic.

Step6: The signal processing unit integrated in the smart terminal calculates the ultrasonic ranging signal delay times according to the ultrasonic signal delay detection algorithm, thereby calculating the distance L between respective ultrasonic signal generators and the ultrasonic signal receiver.

Step7: The signal processing unit in the smart terminal calculates the relative coordinates of the smart terminal of the positioning device according to the relative coordinates of the respective ultrasound generators and the trigonometric algorithm. The calculation process is as follows:

Assume that the relative coordinates of the smart terminal are (x, y, z), and the relative coordinates of respective ultrasound generators are (x1, y1, z1), (x2, y2, z2), (x3, y3, z3), (x4, y4, z4), Li is the distance between respective ultrasound generators and the ultrasonic receiver where (i=1, 2, 3, 4):

$$L1 = r0 + \left[(x-x1)^2 + (y-y1)^2 + (z-z1)^2\right]^{\frac{1}{2}};$$

$$L2 = r0 + \left[(x-x2)^2 + (y-y2)^2 + (z-z2)^2\right]^{\frac{1}{2}};$$

$$L3 = r0 + \left[(x-x3)^2 + (y-y3)^2 + (z-z3)^2\right]^{\frac{1}{2}};$$

$$L4 = r0 + \left[(x-x4)^2 + (y-y4)^2 + (z-z4)^2\right]^{\frac{1}{2}};$$

Where r0 is the distance error caused by the asynchronous clock between the transmitting end of the ranging signal and the receiving end of the ranging signal. Finally, the relative coordinates (x, y, z) of the smart terminal are obtained.

Step8: The signal processing unit integrated in the smart terminal converts the relative coordinates of the smart terminal into latitude and longitude coordinates according to the coordinate conversion algorithm, and the smart terminal respectively acquires the latitude and longitude coordinates of the O point and the B point in the step 3 from the cloud database, that is (W1, J1) and (W2, J2).

Step9: The smart terminal sends the relative coordinates and the converted latitude and longitude coordinates to the cloud database, and the cloud database identifies the relative coordinates to indoor map, and the latitude and longitude coordinates are identified to a latitude and longitude map.

Figure 11:
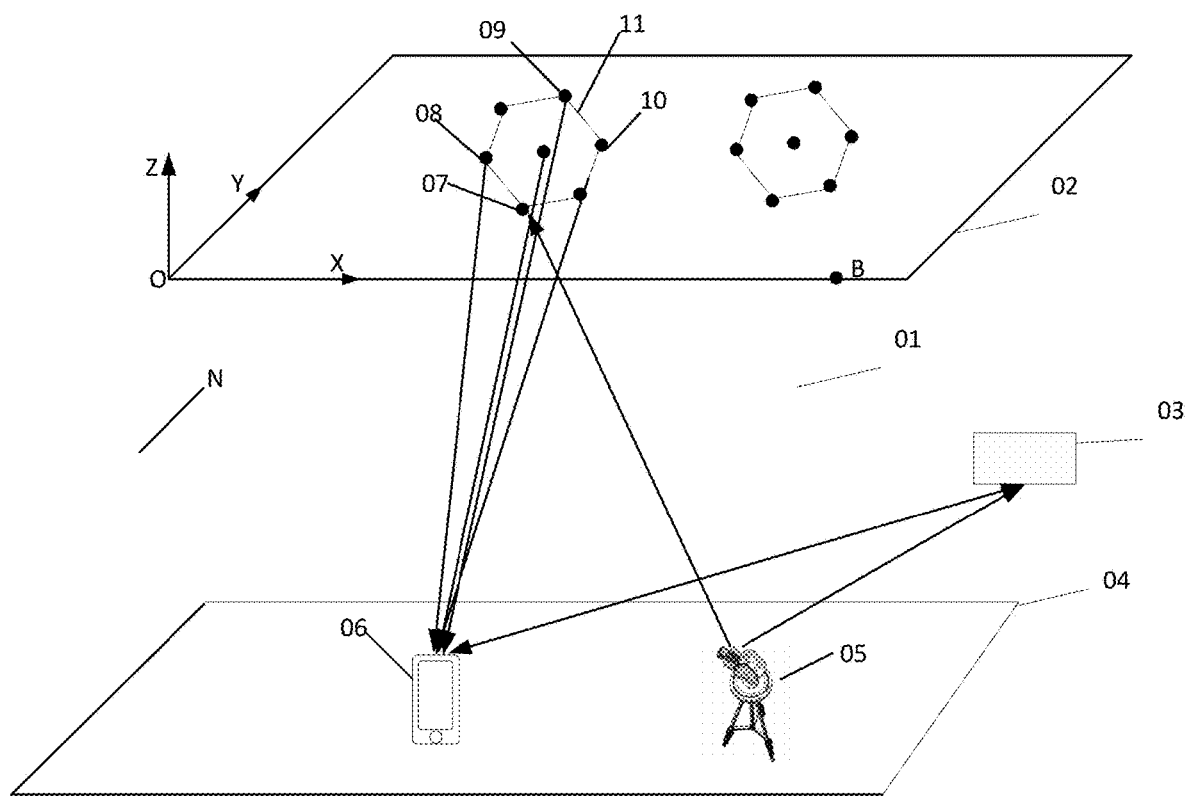
FIG. 11 is a diagram showing an exemplary arrangement and positioning process of the positioning mode of the present invention.

FIG. 11 is a diagram showing an exemplary arrangement and positioning process of the positioning mode of the present invention. In FIG. 11, reference numeral 01 is an indoor venue; reference numeral 02 is a ceiling in a certain venue; reference numeral 03 is a cloud database; reference numeral 04 is an indoor ground; reference numeral 05 is a reverse calibrator; reference numeral 06 is a smart terminal; reference numeral 11 is an ultrasonic signal generating unit; reference numerals 07, 08, 09, 10 are respective ultrasonic ranging signal transmitter (i.e., calibrated devices) in the ultrasonic signal generating unit 11. The specific implementation steps include:

Step1: Install ranging signal transmitting end at the position 02 of the indoor venue 01, and set the indoor coordinate system X-Y-Z of the indoor venue 01.

Step2: set up indoor coordinate system X-Y-Z of the indoor venue 01, and set up a cloud database storing latitude and longitude map and the ID of each signal transmitting end.

Step3: The reverse calibrator 05 is placed on the indoor floor 04, and the level is adjusted according to the level and tripod in the reverse calibrator 05, so that the level keeps absolute level at the measuring point on the ground.

Step4: the signal processor in the reverse calibrator 05 calculates relative coordinates of the calibration point (xi, yi, zi).

Taking the ultrasonic signal transmitter 07 in FIG. 11 as an example, the calculation process includes:

(4.1) Rotate the calibrator so that it is aligned with the origin O in the coordinate system XYZ to measure the O point measurement parameters ($r_0$, $θ_0$, $α_o$). Rotate the calibrator so that it is aligned to a point B on the OX axis in the coordinate system X-Y-Z and measure measurement parameters of point B ($r_B$, $θ_B$, $α_B$). Rotate the calibrator so that it is aligned with the calibration point signal transmitter 07 and measure the calibration point measurement parameters ($r_1$, $θ_1$, $α_1$).

(4.2) According to the relative coordinates of point O and the measured values of point O and point B, the value of $X_B$ in the relative coordinates of point B is calculated by the cosine theorem, and the coordinates of reference point O are (0, 0, 0), and the coordinates of point B are ($X_B$, 0, 0) where $$X_B = \sqrt{(\cos α_O r_O)^2 + (\cos α_B r_B)^2 - 2\cos(θ_O - θ_B) \cdot \cos α_O r_O \cdot \cos α_B r_B}.$$

(4.3) Calculate the relative coordinates ($X_1$, $Y_1$, $Z_1$) of the calibration point, that is, the ultrasonic signal transmitting end 07, according to the measured values of point O, point B, the calibrated point ultrasound generator 07 with respect to point A and relative coordinates of point B. Let measurement parameters of the O point be ($r_0$, $θ_0$, $α_o$), measurement parameters of the B point be ($r_B$, $θ_B$, $α_B$), and the measured parameters of the calibrated point (ultrasound generator 07) be ($r_1$, $θ_1$, $α_1$), relative coordinates of point B be ($X_B$, 0, 0), the values of $X_1$, $Y_1$, $Z_1$ in the relative coordinates of the ultrasound generator 07 are also calculated according to cosine theorem.

(4.4), according to the x, y, z calculated in step 3, the relative coordinates ($X_1$, $Y_1$, $Z_1$) of the transmitting device ranging signal 07 of the calibration device are acquired and sent to cloud database. The relative coordinates of the calibrated device are stored according to a stored list or calibrated device ID.

Step5: Repeat step4 to calibrate relative coordinates of respective ultrasonic signal transmitters s 08, 09, 10, that are (x2, y2, z2), (x3, y3, z3), (x4, y4, z4), and the reverse calibrator send the corrected relative coordinates of respective ultrasonic signal transmitters 07, 08, 09 and 10 to the cloud database.

Step6: the signal controller in the ultrasonic signal generating unit 11 processes the acoustic ranging signal by using a spread spectrum technique, and sends the processed ultrasonic ranging signal x[n] through each ultrasound signal transmitters. The specific steps for generating x[n] are as follows:

The acoustic ranging signal x[n] is a product of a spreading code and a carrier signal, and the carrier signal is a sinusoidal function of frequency fo. x[n]=p[n]*sin (2π*f0*t[n]), where p[n] is a spread-spectrum pseudo-random code, which can be used as follows:

1. An m sequence and its derived pseudo-random sequence (Gold Codes, etc.), m sequence is a commonly used input signal in engineering.

2. Improved m sequence

Here, m sequence itself does not have fully ideal autocorrelation properties, and its length is not convenient for digital processing of signals (FFT requires that the sequence length be $2^n$, and the length of the m sequence is ($2^n-1$).

The improved spreading code proposed by the embodiment of the present invention is obtained by the following steps:

(1): configuring an m sequence with the length of $((2^n-1))$ according to an actual application, and extending the length of the m sequence to $(2^n)$.

(2): performing Fourier transform on the extended m sequence in the step 1 to generate an M sequence according to a formula M=FFT(1-2 m).

(3): Generating a new M' sequence of length $2^n$ based on the M sequence:

$M'[1]=abs(M[1])$ $M'[2^{n-1}]=abs(M[1])$

Then there are:

$$M'[k] = \begin{cases} M[k] & 1 \le k \le 2^{n-1}-1 \\ absM[1] & k = 2^{n-1} \\ M[k-1] & 2^{n-1}+1 \le k \le 2^n \end{cases}$$

(4): calculating m' according to a formula m'=IFFTM'.

Thus, a pseudo-random sequence p(n)=m' is obtained, and the sequence length is $2^n$, and the transmission ranging acoustic signal x[n] is obtained.

Step7: the ultrasound receiving unit in the smart terminal 06 receives ultrasonic ranging signals transmitted from respective ultrasound generators, acquires relative coordinates of respective ultrasound generators (x1, y1, z1), (x2, y2, z2), (x3, y3, z3), (x4, y4, z4) and other measurement parameters, from the cloud according to the ID information in the ultrasonic ranging signal.

Step8: the signal processing unit in the smart terminal 06 performs the ultrasonic delay signal time delay detection. Take the received ultrasonic ranging signal x01 from the ultrasonic ranging signal generator 07 as an example, the time delay detecting steps are as follows:

(8.1) extracting a signal x02 corresponding to $$N1 = N0 * \frac{Tr}{Tt}$$

from x01 according to Doppler frequency offset information, and converting the length of x02 to N0 by up Sampling or Down Sampling to obtain x03.

If N1<N0, the signal x02 is sampled by the up sampling method to obtain x03 of the signal length N1=N0. If N1>N0, the signal x02 is sampled by the down sampling method to obtain x03 of the signal length N1=N0.

(8.2) converting x0 and x03 to baseband signals to obtain X0 and X1.

(8.3) obtaining the signal spectrum of X0 and X1 by Fourier transformation, where F0=FFT(X0); F1=FFT(X1).

(8.4) performing generalized cross-correlation operation (GCC) on the above signals spectra F0 and F1 to obtain a cross-correlation sequence corr(X0, X1) of X0 and X1, wherein:

corr(X0,X1)=IFFT(w*conj(F0)*F1);

Where conj( ) is a conjugate operation, w is a real-valued weighting function used to enhance the peaks in the cross-correlation sequence and the noise immunity of the above algorithm.

(8.5) finding the position Nmax corresponding to the maximum correlation value in corr(X0, X1) (the convention Nmax=0 corresponds to the maximum value in the first position). The acoustic signal delay time is:

$$\Delta T = \frac{N\max}{Fs} * \frac{Tt}{Tr};$$

Where $$\frac{Tt}{Tr}$$

is a correction factor whose purpose is to make ΔT more accurate. Tt represents the observed value of the characteristic parameters of the acoustic signal at the transmitting end, Tr represents the observed value of the characteristic parameters of the acoustic signal at the receiving end, and Fs represents the sampling rate of the acoustic signal.

The distance between the ultrasonic signal transmitters and the ultrasonic signal receiver is L1=c*Δ T, where C is the propagation speed of the ultrasound in the air. Respectively repeat step 8 to calculate the distances L2, L3, and L4 from signal transmitters 08, 09, and 10 to the receiving end.

Step9: The smart terminal 06 acquires the relative coordinates of the ultrasonic signal transmitters 07, 08, 09, 10 and the latitude and longitude coordinates of the reference point O and point B from the cloud.

Step10: The signal processing unit in the smart terminal 06 calculates the relative coordinates of the smart terminal 06 based on the calibration coordinates (x1, y1, z1) of 07, the calibration coordinates (x2, y2, z2) of the 08, the calibration coordinates (x3, y3, z3) of the 09 and respective distances L1, L2, L3, L4 from the 07, 08, 09, and 10 to the ultrasound receiving unit in the smart terminal. The calculation process is as follows:

$$\begin{cases} L1 = r0 + [(x-x1)^2 + (y-y1)^2 + (z-z1)^2]^{\frac{1}{2}} \\ L2 = r0 + [(x-x2)^2 + (y-y2)^2 + (z-z2)^2]^{\frac{1}{2}} \\ L3 = r0 + [(x-x3)^2 + (y-y3)^2 + (z-z3)^2]^{\frac{1}{2}} \\ L1 = r0 + [(x-x4)^2 + (y-y4)^2 + (z-z4)^2]^{\frac{1}{2}} \end{cases}$$

Based on the above equations, the relative coordinates (x, y, z) of the smart terminal 06 can be derived.

Step11: the signal processing unit in the smart terminal 06 converts the relative coordinates of the smart terminal 06 into latitude and longitude coordinates according to the coordinate conversion algorithm. It is known that the latitude and longitude coordinates of the O point and the B point in the fourth step are respectively (W1, J1) (W2, J2), and the specific conversion steps are as follows:

(11.1) The positioning device 06 calculates the angle γ between O-Y axis and geographical north based on latitude and longitude coordinates of point B in the OX axis and point O, respectively (W1, J1) (W2, J2), obtained from cloud and on a Baidu map.

(11.2) Convert the x, y coordinates in the field coordinate system to x', y' in geographic coordinates according to the angle γ.

$$\begin{cases} X' = \cos\gamma * X - \sin\gamma * Y \\ Y' = \sin\gamma * X + \cos\gamma * Y \end{cases}$$

(11.3) Calculate latitude and longitude coordinates of the device being positioned based on the coordinates of the device being positioned in geographic coordinates: (x', y') and latitude and longitude coordinates of the O-point (W1, J1), where $$W = W1 + \frac{Y'}{R0} * \frac{180}{\pi}$$
$$J = J1 + \frac{X'}{COS(W1)R0} * \frac{180}{\pi}$$

Where W, J constituting latitude and longitude coordinates (W, J) of the device being positioned 06.

Step 12: The smart terminal 06 sends the relative coordinates (x,y,z) and the latitude and longitude coordinates (W, J) to the cloud database, and the cloud database maps the relative coordinates and the latitude and longitude coordinates to a corresponding map.

In addition, an embodiment of the present invention also provides a positioning method. The method is applicable to a positioning system comprising a reverse calibrator, an ultrasound generating unit and a device being positioned, the ultrasound generating unit comprising at least three ultrasound generators and a processor, the method comprising: enabling the reverse calibrator to respectively calibrate relative coordinates of the at least three ultrasound generators in a field coordinate system; enabling the processor to generate a carrier signal, multiply the carrier signal with a spread-spectrum pseudo-random code to obtain an ultrasonic ranging signal, control each of the at least three ultrasound generators to respectively emit the ultrasonic ranging signal, and respectively extract acoustic characteristic parameter of the each ultrasonic ranging signal emitted by each ultrasound generator; enabling the device being positioned to respectively capture ultrasonic ranging signals emitted by each ultrasound generator, respectively extract acoustic characteristic parameter of each of the captured ultrasonic ranging signals, respectively determine an ultrasonic delay time of each ultrasonic ranging signal based on the acoustic characteristic parameter of each ultrasonic ranging signal emitted by each ultrasound generator and the acoustic characteristic parameter of the captured corresponding ultrasonic ranging signal, calculate relative coordinates of the device being positioned in the field coordinate system based on at least three ultrasonic delay times and calibrated relative coordinates of the at least three ultrasound generators in the field coordinate system.

In one embodiment, wherein the enabling the reverse calibrator to respectively calibrate relative coordinates of the at least three ultrasound generators in a field coordinate system comprises: measuring a distance between a reverse calibrator placement point and a measured point, azimuth angle of the measured point relative to the reverse calibrator placement point and pitch angle of the measured point relative to the reverse calibrator placement point, wherein the measured point includes a calibration point and a reference point, wherein the reference point includes a coordinate origin of the site coordinate system and a predetermined point on an axis of the site coordinate system, the calibration point includes arrangement point of each ultrasound generator; calculating relative coordinates of the predetermined point in the site coordinate system based on a distance between the coordinate origin and the reverse calibrator placement point, an azimuth angle of the coordinate origin relative to the reverse calibrator placement point, a pitch angle of the coordinate origin relative to the reverse calibrator placement point, a distance between the predetermined point and the reverse calibrator placement point, an azimuth angle of the predetermined point relative to the reverse calibrator placement point and a pitch angle of the predetermined point relative to the reverse calibrator placement point; calculating relative coordinates of the calibration point in the site coordinate system based on relative coordinates of the predetermined point in the site coordinate system, the distance between the coordinate origin and the reverse calibrator placement point, the azimuth angle of the coordinate origin relative to the reverse calibrator placement point, the pitch angle of the coordinate origin relative to the reverse calibrator placement point, the distance between the predetermined point and the reverse calibrator placement point, the azimuth angle of the predetermined point relative to the reverse calibrator placement point, the pitch angle of the predetermined point relative to the reverse calibrator placement point, the distance between the calibration point and the reverse calibrator placement point, the azimuth angle of the calibration point relative to the reverse calibrator placement point and the pitch angle of the calibration point relative to the reverse calibrator placement point.

In one embodiment, the spread-spectrum pseudo-random code is an m-sequence or a pseudo-random sequence derived from m-sequence; or the spread-spectrum pseudo-random code is obtained based on the following steps:

configuring m sequence of length ($2^n$-1), where n is a positive integer;

extending the m sequence of length ($2^n$-1) to m sequence of length $2^n$;

generating M sequence based on m sequence of length $2^n$, M=FFT(1-2 m), where

FFT is fast Fourier transform function;

generating a M' sequence of length $2^n$ based on the M sequence according to a formula $$M'[k] = \begin{cases} M[k] & 1 \le k \le 2^{n-1} - 1 \\ \text{abs}M[1] & k = 2^{n-1} \\ M[k-1] & 2^{n-1} + 1 \le k \le 2^n \end{cases},$$

wherein k is a point number, abs is an absolute value function;

performing an inverse fast Fourier transform on the M' sequence of length $2^n$ to generate an m' sequence as the pseudorandom code.

In one embodiment, wherein determining the ultrasonic delay time comprises: converting the length of the ultrasonic ranging signal captured by the device being positioned to the same as the length of the ultrasonic ranging signal emitted by the ultrasound generator, by up sampling or down sampling; performing a cross-correlation operation based on the ultrasonic ranging signal emitted by the ultrasound generator and the length-converted ultrasonic ranging signal to obtain a cross-correlation sequence; finding a position corresponding to a maximum correlation value in the cross-correlation sequence; calculating the ultrasonic delay time based on the position corresponding to the maximum correlation value in the cross-correlation sequence, the acoustic characteristic parameter of the ultrasonic ranging signal emitted by the ultrasound generator, and the acoustic characteristic parameter of the captured ultrasonic ranging signal.

In one embodiment, the method further comprising: acquiring latitude and longitude coordinates of the coordinate origin and latitude and longitude coordinates of the predetermined point; calculating an angle between the northward axis of the field coordinate system and the geographical north based on latitude and longitude coordinates of the coordinate origin and latitude and longitude coordinates of the predetermined point; calculating latitude and longitude coordinates of the calibration point by the angle; correspondingly identifying latitude and longitude coordinates of the calibration point to a predetermined map; and/or calculating latitude and longitude coordinates of the device being positioned by the angle; correspondingly identifying latitude and longitude coordinates of the device being positioned to a predetermined map.

In summary, the embodiment of the present invention is simple, adopts ultrasonic ranging, the ultrasound has strong directivity in a short distance range, and the ranging is accurate, and the ultrasonic transmitting units in the ultrasonic transmitting unit are regularly distributed in a fixed geometric figure. The other transmitter coordinates are calculated by the geometric relationship and the main transmitter coordinates, which can reduce the error caused by the measurement. In addition, the reverse calibration technique is used to inversely calibrate the ultrasonic transmitter coordinates, so that the reference coordinate values in the positioning algorithm are more accurate. The embodiment of the present invention also proposes a spread spectrum technique to reduce the influence of the Doppler phenomenon on the positioning accuracy of the moving object. In addition, the embodiment of the present invention also proposes a coordinate conversion technology, which converts indoor coordinates into latitude and longitude coordinates, and realizes "last mile" positioning navigation of GPS.

A person skilled in the art may understand that all or part of the steps of implementing the foregoing embodiments may be completed by hardware, or may be instructed by a program to execute related hardware, and the program may be stored in a computer readable storage medium. The storage medium mentioned may be a read only memory, a magnetic disk or an optical disk or the like. Moreover, all or part of the steps of the foregoing embodiments of the present invention may also be implemented by a network system including a network node, which can fully utilize the advantages of the hardware environment at both ends of the client and the server, and appropriately allocate tasks to the client and the server. The end is implemented to reduce the communication overhead of the system. The client can be a thin client (Thin Client), which can be a basic application-free computer terminal in the client-server network system, and the thin client can communicate with the server through some common communication protocols. And then access the LAN. Each of the embodiments of the present invention can be implemented by a data processing program executed by a data processing device such as a computer. Obviously, the data processing program constitutes the present invention. Further, a data processing program usually stored in a storage medium is executed by directly reading a program out of a storage medium or by installing or copying the program to a storage device (such as a hard disk and or a memory) of the data processing device. Therefore, such a storage medium also constitutes the present invention. The storage medium can use any type of recording method, such as paper storage medium (such as paper tape, etc.), magnetic storage medium (such as floppy disk, hard disk, flash memory, etc.), optical storage medium (such as CD-ROM, etc.), magneto-optical storage medium (Such as MO, etc.). The present invention therefore also discloses a storage medium in which is stored a data processing program for performing any of the above embodiments of the present invention.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

The invention claimed is:

1. A positioning system, comprising:
   an ultrasound generating unit comprising at least three ultrasound generators and a processor;
   a reverse calibrator, configured to respectively calibrate relative coordinates of the at least three ultrasound generators in a field coordinate system;
   the processor, configured to generate a carrier signal, multiply the carrier signal with a spread-spectrum pseudo-random code to obtain an ultrasonic ranging signal, control each of the at least three ultrasound generators to respectively emit the ultrasonic ranging signal, and respectively extract acoustic characteristic parameter of ultrasonic ranging signal emitted by each ultrasound generator;
   a device being positioned, configured to respectively capture ultrasonic ranging signals emitted by each ultrasound generator, respectively extract acoustic characteristic parameter of each of the captured ultrasonic ranging signals, respectively determine an ultrasonic delay time of each ultrasonic ranging signal based on the acoustic characteristic parameter of ultrasonic ranging signal emitted by each ultrasound generator and the acoustic characteristic parameter of the captured corresponding ultrasonic ranging signal, calculate relative coordinates of the device being positioned in the field coordinate system based on at least three ultrasonic delay times and calibrated relative coordinates of the at least three ultrasound generators in the field coordinate system;
   wherein the reverse calibrator comprising:
   a level module, configured to maintain the reverse calibrator level during a calibration process;
   a distance measuring module, configured to measure a distance between a reverse calibrator placement point and a measured point, wherein the measured point includes a calibration point and a reference point, wherein the reference point includes a coordinate origin of the site coordinate system and a predetermined point on an axis of the site coordinate system, the calibration point includes arrangement point of each ultrasound generator; and
   an angle measuring module, configured to measure azimuth angle and pitch angle of the measured point relative to the reverse calibrator placement point.

2. The system according to claim 1, wherein the reverse calibrator comprising:
   a signal processor, configured to:
   calculate relative coordinates of the predetermined point in the site coordinate system based on a distance between the coordinate origin and the reverse calibrator placement point, an azimuth angle of the coordinate origin relative to the reverse calibrator placement point, a pitch angle of the coordinate origin relative to the reverse calibrator placement point, a distance between the predetermined point and the reverse calibrator placement point, an azimuth angle of the predetermined point relative to the reverse calibrator placement point and a pitch angle of the predetermined point relative to the reverse calibrator placement point, calculate relative coordinates of the calibration point in the site coordinate system based on relative coordinates of the predetermined point in the site coordinate system, the distance between the coordinate origin and the reverse calibrator placement point, the azimuth angle of the coordinate origin relative to the reverse calibrator placement point, the pitch angle of the coordinate origin relative to the reverse calibrator placement point, the distance between the predetermined point and the reverse calibrator placement point, the azimuth angle of the predetermined point relative to the reverse calibrator placement point, the pitch angle of the predetermined point relative to the reverse calibrator placement point, the distance between the calibration point and the reverse calibrator placement point, the azimuth angle of the calibration point relative to the reverse calibrator placement point and the pitch angle of the calibration point relative to the reverse calibrator placement point.

3. The system according to claim 2, wherein the signal processor is further configured to
acquire latitude and longitude coordinates of the coordinate origin and latitude and longitude coordinates of the predetermined point; calculate an angle between the northward axis of the field coordinate system and a geographical north based on the latitude and longitude coordinates of the coordinate origin and the latitude and longitude coordinates of the predetermined point;
calculate latitude and longitude coordinates of the calibration point based on the angle and relative coordinates of the calibration point in the site coordinate system, and/or
relative coordinates of the predetermined point in the site coordinate system being $(X_B, 0, 0)$, wherein $$X_B = \sqrt{(\cos\alpha_O r_O)^2 + (\cos\alpha_B r_B)^2 - 2\cos(\theta_O - \theta_B)\cdot\cos\alpha_O r_O \cdot \cos\alpha_B r_B}\ ;$$

wherein relative coordinates of the coordinate origin in the site coordinate system is (0, 0, 0); the distance between the coordinate origin and the reverse calibrator placement point is $r_O$; the azimuth angle of the coordinate origin relative to the reverse calibrator placement point is $\theta_O$; the pitch angle of the coordinate origin relative to the reverse calibrator placement point is $\alpha_O$; the distance between the predetermined point and the reverse calibrator placement point is $r_B$; the azimuth angle of the predetermined point relative to the reverse calibrator placement point is $\theta_B$; the pitch angle of the predetermined point relative to the reverse calibrator placement point is $\alpha_B$; the site coordinate system comprising Y axis, X axis and Z axis and the coordinate origin, wherein the Y axis is northward in the field, and latitude and longitude coordinates of the calibration point are (W, J);

wherein $$W = W1 + \frac{Y'}{R0} * \frac{180}{\pi};$$

$$J = J1 + \frac{X'}{\cos(W1)R0} * \frac{180}{\pi};$$

$$\begin{cases} X' = \cos\gamma * X - \sin\gamma * Y \\ Y' = \sin\gamma * X + \cos\gamma * Y \end{cases};$$

R0 is an average radius of the earth; (W1, J1) is latitude and longitude coordinate of the coordinate origin; $\gamma$ is the angle between the northward axis of the site coordinate system and geographical north; (X, Y) is the relative coordinates of the calibration point in the site coordinate system.

4. The system according to claim 2, wherein
the signal processor, further configured to acquire latitude and longitude coordinates of the coordinate origin and latitude and longitude coordinates of the predetermined point; calculate an angle between the northward axis of the field coordinate system and the geographical north based on latitude and longitude coordinates of the coordinate origin and latitude and longitude coordinates of the predetermined point; calculate latitude and longitude coordinates of the calibration point by the angle;

wherein the positioning system further comprising:
a cloud database, configured to receive latitude and longitude coordinates of the calibration point from the signal processor, and correspondingly identify latitude and longitude coordinates of the calibration point to a predetermined map.

5. The system according to claim 1, wherein the spread-spectrum pseudo-random code is an m-sequence or a pseudo-random sequence derived from m-sequence; or
the spread-spectrum pseudo-random code is obtained based on the following steps:
configuring m sequence of length $(2^n-1)$, where n is a positive integer;
extending the m sequence of length $(2^n-1)$ to m sequence of length $2^n$;
generating M sequence based on m sequence of length $2^n$, M=FFT(1-2m), where FFT is fast Fourier transform function;
generating a M' sequence of length $2^n$ based on the M sequence according to a formula $$M'[k] = \begin{cases} M[k] & 1 \le k \le 2^{n-1} - 1 \\ \mathrm{abs}M[1] & k = 2^{n-1} \\ M[k-1] & 2^{n-1} + 1 \le k \le 2^n \end{cases},$$

wherein k is a point number, abs is an absolute value function;
performing an inverse fast Fourier transform on the M' sequence of length $2^n$ to generate an m' sequence as the spread-spectrum pseudo-random.

6. The system according to claim 1,
wherein the ultrasound generating unit and the device being positioned are configured in a same device to collectively constitute a single-ended system; or
wherein the ultrasound generating unit and the device being positioned are configured in different devices to collectively constitute a double-ended system.

7. The system according to claim 1, wherein determining the ultrasonic delay time comprises:
converting the length of the ultrasonic ranging signal captured by the device being positioned to the same as the length of the ultrasonic ranging signal emitted by the ultrasound generator, by up sampling or down sampling;
performing a cross-correlation operation based on the ultrasonic ranging signal emitted by the ultrasound generator and the length-converted ultrasonic ranging signal to obtain a cross-correlation sequence;
finding a position corresponding to a maximum correlation value in the cross-correlation sequence;
calculating the ultrasonic delay time based on the position corresponding to the maximum correlation value in the cross-correlation sequence, the acoustic characteristic parameter of the ultrasonic ranging signal emitted by ultrasound generator, and the acoustic characteristic parameter of the captured ultrasonic ranging signal.

8. The system according to claim 1, wherein
the device being positioned, further configured to acquire latitude and longitude coordinates of the coordinate origin and latitude and longitude coordinates of the predetermined point; calculate an angle between the northward axis of the site coordinate system and the geographical north based on latitude and longitude coordinates of the coordinate origin and latitude and longitude coordinates of the predetermined point; calculate latitude and longitude coordinates of the device being positioned by the angle;
the positioning system further comprising:
a cloud database, configured to receive latitude and longitude coordinates of the device being positioned from the device being positioned, and correspondingly identify latitude and longitude coordinates of the located device to a predetermined map.

9. A positioning method, characterized in that the method is applicable to a positioning system comprising a reverse calibrator, an ultrasound generating unit and a device being positioned, wherein the ultrasound generating unit comprising at least three ultrasound generators and a processor, the method comprising:
enabling the reverse calibrator to respectively calibrate relative coordinates of the at least three ultrasound generators in a field coordinate system;
enabling the processor to generate a carrier signal, multiply the carrier signal with a spread-spectrum pseudo-random code to obtain an ultrasonic ranging signal, control each of the at least three ultrasound generators to respectively emit the ultrasonic ranging signal, and respectively extract acoustic characteristic parameter of the each ultrasonic ranging signal emitted by each ultrasound generator;
enabling the device being positioned to respectively capture ultrasonic ranging signals emitted by each ultrasound generator, respectively extract acoustic characteristic parameter of each of the captured ultrasonic ranging signals, respectively determine an ultrasonic delay time of each ultrasonic ranging signal based on the acoustic characteristic parameter of ultrasonic ranging signal emitted by each ultrasound generator and the acoustic characteristic parameter of the captured corresponding ultrasonic ranging signal, calculate relative coordinates of the device being positioned in the field coordinate system based on at least three ultrasonic delay times and calibrated relative coordinates of the at least three ultrasound generators in the field coordinate system; and
measuring a distance between a reverse calibrator placement point and a measured point, azimuth angle of the measured point relative to the reverse calibrator placement point and pitch angle of the measured point relative to the reverse calibrator placement point, wherein the measured point includes a calibration point and a reference point, wherein the reference point includes a coordinate origin of the site coordinate system and a predetermined point on an axis of the site coordinate system, the calibration point includes arrangement point of each ultrasound generator.

10. The method according to claim 9, wherein the enabling the reverse calibrator to respectively calibrate relative coordinates of the at least three ultrasound generators in a field coordinate system comprising:
calculating relative coordinates of the predetermined point in the site coordinate system based on a distance between the coordinate origin and the reverse calibrator placement point, an azimuth angle of the coordinate origin relative to the reverse calibrator placement point, a pitch angle of the coordinate origin relative to the reverse calibrator placement point, a distance between the predetermined point and the reverse calibrator placement point, an azimuth angle of the predetermined point relative to the reverse calibrator placement point and a pitch angle of the predetermined point relative to the reverse calibrator placement point; calculating relative coordinates of the calibration point in the site coordinate system based on relative coordinates of the predetermined point in the site coordinate system, the distance between the coordinate origin and the reverse calibrator placement point, the azimuth angle of the coordinate origin relative to the reverse calibrator placement point, the pitch angle of the coordinate origin relative to the reverse calibrator placement point, the distance between the predetermined point and the reverse calibrator placement point, the azimuth angle of the predetermined point relative to the reverse calibrator placement point, the pitch angle of the predetermined point relative to the reverse calibrator placement point, the distance between the calibration point and the reverse calibrator placement point, the azimuth angle of the calibration point relative to the reverse calibrator placement point and the pitch angle of the calibration point relative to the reverse calibrator placement point.

11. The method according to claim 9, wherein the spread-spectrum pseudo-random code is an m-sequence or a pseudo-random sequence derived from m-sequence; or
the spread-spectrum pseudo-random code is obtained based on the following steps:
configuring m sequence of length ($2^n-1$), where n is a positive integer;
extending the m sequence of length ($2^n-1$) to m sequence of length $2^n$;
generating M sequence based on m sequence of length $2^n$, M=FFT(1-2m), where FFT is fast Fourier transform function;
generating a M' sequence of length $2^n$ based on the M sequence according to a formula $$M'[k] = \begin{cases} M[k] & 1 \le k \le 2^{n-1}-1 \\ \text{abs}M[1] & k = 2^{n-1} \\ M[k-1] & 2^{n-1}+1 \le k \le 2^n \end{cases},$$

wherein k is a point number, abs is an absolute value function;
performing an inverse fast Fourier transform on the M' sequence of length $2^n$ to generate an m' sequence as the spread-spectrum pseudo-random.

12. The method according to claim 9, wherein determining the ultrasonic delay time comprises:
converting the length of the ultrasonic ranging signal captured by the device being positioned to the same as the length of the ultrasonic ranging signal emitted by the ultrasound generator, by up sampling or down sampling;
performing a cross-correlation operation based on the ultrasonic ranging signal emitted by the ultrasound generator and the length-converted ultrasonic ranging signal to obtain a cross-correlation sequence;
finding a position corresponding to a maximum correlation value in the cross-correlation sequence;
calculating the ultrasonic delay time based on the position corresponding to the maximum correlation value in the cross-correlation sequence, the acoustic characteristic parameter of the ultrasonic ranging signal emitted by the ultrasound generator, and the acoustic characteristic parameter of the captured ultrasonic ranging signal.

13. The method according to claim 9, further comprising:
acquiring latitude and longitude coordinates of the coordinate origin and latitude and longitude coordinates of the predetermined point; calculating an angle between the northward axis of the field coordinate system and the geographical north based on latitude and longitude coordinates of the coordinate origin and latitude and longitude coordinates of the predetermined point;
calculating latitude and longitude coordinates of the calibration point by the angle; correspondingly identifying latitude and longitude coordinates of the calibration point to a predetermined map; and/or
calculating latitude and longitude coordinates of the device being positioned by the angle; correspondingly identifying latitude and longitude coordinates of the device being positioned to a predetermined map.

14. The method according to claim 9, wherein the respectively calibrating relative coordinates of the at least three ultrasound generators in a field coordinate system comprises:
enabling the reverse calibrator to respectively calibrate the relative coordinates of each of the at least three ultrasound generators in the field coordinate system when the at least three ultrasound generators are in random mounting positions in the field coordinate system; or
when mounting positions of the at least three ultrasound generators have a predetermined geometric relationship in the field coordinate system, enabling the reverse calibrator to calibrate the relative coordinates of one of the at least three ultrasound generators in the field coordinate system and calculate the relative coordinates of the remaining ultrasound generators in the field coordinate system based on the predetermined geometric relationship and the relative coordinates of the ultrasound generator in the field coordinate system obtained by the calibration.

* * * * *